(12) United States Patent
Masumoto

(10) Patent No.: US 12,138,994 B2
(45) Date of Patent: Nov. 12, 2024

(54) SEALING STRUCTURE FOR TRUCK CARGO BED WITH SHUTTER

(71) Applicant: NISHIKAWA RUBBER CO., LTD., Hiroshima (JP)

(72) Inventor: Atsuo Masumoto, Hiroshima (JP)

(73) Assignee: NISHIKAWA RUBBER CO., LTD., Hiroshima-ken (JP)

(*) Notice: Subject to any disclaimer, the term of this patent is extended or adjusted under 35 U.S.C. 154(b) by 310 days.

(21) Appl. No.: 17/947,299

(22) Filed: Sep. 19, 2022

(65) Prior Publication Data

US 2023/0093362 A1 Mar. 23, 2023

(30) Foreign Application Priority Data

Sep. 22, 2021 (JP) .................... 2021-154382

(51) Int. Cl.
*B60J 10/00* (2016.01)
*B62D 33/03* (2006.01)

(52) U.S. Cl.
CPC .............. *B60J 10/45* (2016.02); *B62D 33/03* (2013.01)

(58) Field of Classification Search
CPC ... B60J 10/45; B60J 10/90; B60J 10/86; B60J 7/041; B60J 7/141; B62D 33/037; B62D 33/03; B62D 33/0273
USPC .... 296/39.1, 100.01, 100.03, 100.04, 100.05
See application file for complete search history.

(56) References Cited

U.S. PATENT DOCUMENTS

| 4,492,405 | A | 1/1985 | Chikaraishi et al. |
| 4,824,162 | A | 4/1989 | Geisler et al. |
| 10,538,150 | B2 * | 1/2020 | Zichettello ............... B60J 7/068 |
| 11,351,848 | B2 * | 6/2022 | Matsumoto ............. B60J 10/90 |
| 2017/0136862 | A1 * | 5/2017 | Chung ...................... B60P 7/02 |
| 2020/0384839 | A1 | 12/2020 | Matsumoto |

FOREIGN PATENT DOCUMENTS

| JP | S59014519 A | 1/1984 |
| JP | S64056281 A | 3/1989 |
| JP | H04136921 U | 12/1992 |
| JP | H07290966 A | 11/1995 |
| JP | H09300964 A | 11/1997 |
| JP | H10166869 A | 6/1998 |
| JP | 2000190730 A | 7/2000 |
| JP | 2006248426 A | 9/2006 |
| JP | 2016088254 A | 5/2016 |
| JP | 2019189048 A | 10/2019 |
| JP | 2020199885 A | 12/2020 |

* cited by examiner

*Primary Examiner* — Amy R Weisberg
*Assistant Examiner* — Denise L Esquivel
(74) *Attorney, Agent, or Firm* — Holtz, Holtz & Volek PC

(57) ABSTRACT

An end cap couples a shutter to an upper part of a track cargo bed between left and right tracks. A shutter seal member is provided on a rear end of the shutter, and makes elastic contact with a tailgate mounted on a rear end of the truck cargo bed. A bed liner seal member is provided on rear ends of left and right side walls, and includes an installation plate member and a hollow wall. An extended wall extends vertically from part of an upper end of the hollow wall closer to an exterior of an automobile. The hollow wall has an opening at an upper part. A first horizontal surface of the end cap of a sealing structure covers an upper part of the tailgate, and a second horizontal surface faces and contactlessly approaches a top edge of the extended wall.

20 Claims, 17 Drawing Sheets

SEALING STRUCTURE FOR TRUCK CARGO BED WITH SHUTTER

CROSS REFERENCE TO RELATED APPLICATION

This application claims the benefit under 35 USC § 19 of JP Patent Application JP 2021-154382 filed Sep. 22, 2021, the entire disclosure of which is incorporated herein by reference.

BACKGROUND INFORMATION

The present invention relates to a sealing structure for a truck cargo bed with a shutter. The shutter couples to an upper part of the truck cargo bed and moves between at least two positions to open and close an opening of the truck cargo bed.

Automobiles with a truck cargo bed 1 and a shutter 100 as illustrated in FIG. 1 are widely used. The shutter 100 moves between at least two positions to open and close an opening at an upper part of the truck cargo bed 1.

The shutter 100 couples to the truck cargo bed 1 by a left track 201 and a right track 301. The left and right tracks 201, 301 are mounted on top edges of a left side wall 2 and a right side wall 3. The left and right side walls 2, 3 are vertically mounted on a left end and a right end of the truck cargo bed 1. A tailgate 5 is mounted on a rear end of the truck cargo bed 1 and is pivotal in a front-rear direction of an automobile body.

The tailgate 5 and the left and right side walls 2, 3 surround the truck cargo bed 1 when the tailgate 5 is in a closed position. The shutter 100, when fully extended from a front part of the truck cargo bed 1 to the rear end, shuts an entire cargo area to close the opening at the upper part of the truck cargo bed 1.

While weather strips seal a linear space between the shutter 100 and tailgate 5, a part Z in FIG. 1 is hard to seal, and water permeates the truck cargo bed 1 from a space in the part Z. The part Z indicates upper parts of left and right rear ends of the truck cargo bed 1.

This configuration imposes limitations such as putting a cargo into a front part of the truck cargo bed 1 to protect the cargo from water.

In this connection, Japanese unexamined Patent Publication No. 2020-199885 is directed to the sealing structure illustrated in FIGS. 1 to 3. The structure includes: a bed liner seal member 10 provided on rear ends of the left and right side walls 2, 3; a protrusion 11 which forms part of the bed liner seal member 10; an end cap 110 which is provided on a left side end and a right side end of a rear part of the shutter 100 and makes elastic contact with the bed liner seal member 10 when the shutter 100 is fully extended; and first and second seal beads 21, 22 on an upper surface which are provided on an upper wall 12 of the protrusion 11. The end cap 110 touches the first and second seal beads 21, 22 when the shutter 100 is in a closed position. The shutter 100 couples to the left track 201 and the right track 301 by the end cap 110.

Japanese unexamined Patent Publication No. 2020-199885 also discloses a shutter seal member 120, which is provided on a rear end of the shutter 100 and makes elastic contact with the tailgate 5 when the tailgate 5 is in the closed position.

More specifically, a first gutter 25 is provided beneath the protrusion 11 and is closer to the front part of the automobile body than the protrusion 11. The first gutter 25 extends in an inner-cabin and outer-cabin direction of the automobile body. The first gutter 25 is provided between a first wall 26 and a wall of the protrusion 11 closest to the front part of the automobile body. The first wall 26 extends in the right-left direction of the automobile body, and is higher than a bottom surface of the first gutter 25 and lower than an upper wall 12 of the protrusion 11.

A second gutter 27 is provided closer to the interior of the automobile than a side wall 13 of the protrusion 11. The second gutter 27 extends in the front-rear direction of the automobile body. The second gutter 27 is provided between a second wall 28 and the side wall 13. The second wall 28 extends in the front-rear direction of the automobile body, and is higher than a bottom surface of the second gutter 27 and lower than the upper wall 12.

The second gutter 27 is provided on base roots of third and fourth seal beads 23, 24 on a side surface, and lower ends of the third and fourth seal beads 23, 24 connect with the bottom surface of the second gutter 27.

The first gutter 25 and the second gutter 27 are continuous and form an L-shape. The bottom surface is gently lowered toward the second gutter 27 from the first gutter 25. In addition, a hole 29 is provided on an extension of the second gutter 27, that is a position closer to the rear part of the automobile body than the second gutter 27. The hole 29 drains water guided into the first and second gutters 25, 27 toward an exterior of the automobile. The first wall 26 and the second wall 28 are connected with each other and continuous.

An insert 15 is embedded in the bed liner seal member 10 to increase rigidity of the bed liner seal member 10.

This configuration sufficiently seals the part Z in FIG. 1, which indicates the upper parts of the left and right rear ends of the truck cargo bed 1, to prevent water from permeating the truck cargo bed 1 from the exterior the automobile.

Unfortunately, however, using the shutter 100 for years, which moves between at least two positions to open and close the opening of the truck cargo bed 1, can impair the protrusion 11, for the end cap 110 touches each of the first and second seal beads 21, 22 and the third and fourth seal beads 23, 24 when the shutter 100 is in the closed position.

The end cap 110 is required to touch each of the first and second seal beads 21, 22 and the third and fourth seal beads 23, 24 precisely, and thus has the shape limited with restrictions. This narrows acceptable misalignment range of the end cap 110 relative to the protrusion 11.

To solve the above problems, it is an object of the present invention is to provide a sealing structure which is capable of addressing some misalignment and improved in sealing performance at the upper parts of the left and right rear ends of the truck cargo bed with the shutter.

SUMMARY

In order to achieve the above-mentioned object, an aspect of the invention provides a sealing structure for a truck cargo bed with a shutter. The sealing structure includes the truck cargo bed (1), the shutter (100), an end cap (30), a left side wall (2), a right side wall (3), a left track (201), a right track (301), a tailgate (5), a shutter seal member (120), and a bed liner seal member (50).

The shutter (100) couples to an upper part of the truck cargo bed (1) by the left track (201) and the right track (301). The shutter (100) extends in parallel with the truck cargo bed (1), and the shutter (100) moves between at least two positions in a front-rear direction of an automobile body to open and close an opening at the upper part of the truck cargo bed (1).

The end cap (30) is fit on a left side surface and a right side surface of the shutter (100), and the end cap (30) couples the shutter (100) to the left track (201) and the right track (301). The end cap (30) includes: a first horizontal surface (31a) which covers an upper part of the tailgate (5) when the shutter (100) is in a closed position with a tailgate (5) in a closed position; and a second horizontal surface (39a) lower than the first horizontal surface (31a).

The left side wall (2) is vertically mounted on a left end of the truck cargo bed (1).

The right side wall (3) is vertically mounted on a right end of the truck cargo bed (1).

The left track (201) is mounted on a top edge of the left side wall (2).

The right track (301) is mounted on a top edge of the right side wall (3).

The tailgate (5) is mounted on a rear end of the truck cargo bed (1). The tailgate (5) is pivotal in the front-rear direction of the automobile body with a lower end part of the tailgate (5) as a pivotal axis. The tailgate (5) and the left and right side walls (2, 3) surround the truck cargo bed (1) when the tailgate (5) is in the closed position.

The shutter seal member (120) is provided on a rear end of the shutter (100). The shutter seal member (120) makes elastic contact with the tailgate (5) when the tailgate (5) is in the closed position.

The bed liner seal member (50) is provided on rear ends of the left and right side walls (2, 3). The bed liner seal member (50) includes an installation plate member (51), a hollow wall (52), and an extended wall (60).

The installation plate member (51) extends in an upper-lower direction of the automobile body and has an upper end (51a).

The hollow wall (52) is unified with the installation plate member (51). The hollow wall (52) extends in the upper-lower direction, has an upper end higher than the upper end (51a) of the installation plate member (51), and has an opening at an upper part. The upper end of the hollow wall (52) has part closer to an exterior of an automobile relative to a side surface of the automobile body. The hollow wall (52) makes elastic contact with the tailgate (5) when the tailgate (5) is in the closed position, and makes elastic contact with the end cap (30) when the shutter (100) is in the closed position.

The extended wall (60) extends upward in a vertical direction from the part of the upper end of the hollow wall (52) closer to the exterior of the automobile. The extended wall (60) has a top edge (60a). The top edge (60a) of the extended wall (60) faces and contactlessly approaches the second horizontal surface (39a) of the end cap (30) when the shutter (100) is in the closed position.

In addition, according to an aspect of the present invention, the sealing structure further includes an extended installation member (53), an installation member (54), a rear wall (61), a front gutter wall (62), a front wall (63), a rear lateral wall (64), and a third horizontal surface (35a).

The extended installation member (53) is provided on an upper part of the installation plate member (51) of the bed liner seal member (50). The extended installation member (53) extends toward the exterior of the automobile.

The installation member (54) is connected to an end of the extended installation member (53). The installation member (54) attaches the bed liner seal member (50) to the rear ends of the left and right side walls (2, 3).

The rear wall (61) extends upward in the vertical direction from an upper end of the extended installation member (53) and has a wall surface in the front-rear direction of the automobile body. The rear wall (61) has a top edge (61a) and a first edge closer to the exterior of the automobile.

The front gutter wall (62) extends toward a front part of the automobile body from the middle of rear wall (61) and gradually lowers toward an interior of the automobile relative to the side surface of the automobile body. The front gutter wall (62) has a first edge closer to the exterior of the automobile and a second edge closer to the interior of the automobile.

The front wall (63) extends upward in the vertical direction from an end of the front gutter wall (62) closer to the front part of the automobile body and is parallel to the rear wall (61). The front wall (63) has a top edge (63a). The front wall (63) has a first edge closer to the exterior of the automobile and a second edge closer to the interior of the automobile.

The rear lateral wall (64) extends upward in the vertical direction, and is higher than the rear wall (61) and the front wall (63). The rear lateral wall (64) connects the first edge of the rear wall (61), the first edge of the front gutter wall (62), and the first edge of the front wall (63).

The third horizontal surface (35a) is provided on the end cap (30), and is lower than the second horizontal surface (39a).

The rear wall (61) and the front wall (63) are lower than the extended wall (60), and when the shutter (100) is in the closed position, the top edge (61a) of the rear wall (61) and the top edge (63a) of the front wall (63) face and contactlessly approach the third horizontal surface (35a).

In addition, according to an aspect of the present invention, the sealing structure further includes a lateral gutter wall (56), a front lateral wall (57), an inner peripheral wall (65), and a hollow part (52A).

The lateral gutter wall (56) extends toward the front part of the automobile body from the upper end (51a) of the installation plate member (51) of the bed liner seal member (50).

The front lateral wall (57) is provided closer to the exterior of the automobile than the lateral gutter wall (56). The front lateral wall (57) extends vertically, and has a wall surface in an inner-cabin and outer-cabin direction. The front lateral wall (57) has an edge closer to a rear part of the automobile body continuous with the second edge of the front wall (63). The front lateral wall (57) is as high as the front wall (63).

The inner peripheral wall (65) is vertically provided between part of the lateral gutter wall (56) closer to the front part of the automobile body and part of the lateral gutter wall (56) closer to the interior of the automobile. The inner peripheral wall (65) has part closer to the front part of the automobile body continuous with the front lateral wall (57) and part closer to the rear part of the automobile body continuous with the hollow wall (52).

The hollow part (52A) is surrounded by the hollow wall (52).

The second edge of the front gutter wall (62) is connected with an edge of the lateral gutter wall (56) closer to the exterior of the automobile, to drain water (W6) guided into the front gutter wall (62) toward the exterior of the automobile through the lateral gutter wall (56) and the hollow part (52A).

In addition, according to an aspect of the present invention, the sealing structure further includes a larger lip (70)

provided on a top edge of the hollow wall (52) of the bed liner seal member (50). The larger lip (70) continuously extends alongside of part of the hollow wall (52) closer to the rear part of the automobile body, part of the hollow wall (52) closer to the interior of the automobile, and the inner peripheral wall (65). The inner peripheral wall (65) extends vertically from the lateral gutter wall (56). The larger lip (70) extends toward an inner side of the hollow wall (52).

When the shutter (100) is in the closed position, part of the larger lip (70) closer to the front part of the automobile body makes elastic contact with a lower surface of a rear end of the shutter (100), and parts of the larger lip (70) closer to the interior of the automobile and closer to the rear part of the automobile body make elastic contact with the shutter seal member (120).

In addition, according to an aspect of the present invention, the sealing structure further includes a smaller lip (80) provided on an upper part of the extended installation member (53) of the bed liner seal member (50). The smaller lip (80) protrudes toward the rear part of the automobile body. The smaller lip (80) has the extended wall (60) connected with the smaller lip (80), and has an upper surface.

When the shutter (100) is in the closed position, the upper surface of the smaller lip (80) makes elastic contact with the second horizontal surface (39a) of the end cap (30).

In addition, according to an aspect of the present invention, the smaller lip (80) extends upward and leans toward the rear part of the automobile body.

In addition, according to an aspect of the present invention, the upper part of the hollow wall (52) of the bed liner seal member (50) is formed by die molding, and the extended wall (60) widens gradually toward an upper part.

Symbols in parentheses show constituents or items corresponding to the drawings.

According to the present invention, when the shutter is fully extended with the tailgate in the closed position, the shutter seal member provided on the rear end of the shutter makes elastic contact with the tailgate, and the end cap provided on the left side end and the right side end of the rear part of the shutter makes elastic contact with bed liner seal member. This configuration seals upper parts of the rear ends of the left side wall and the right side wall of the truck cargo bed and prevents water from permeating the truck cargo bed from the exterior of the automobile.

The first horizontal surface of the end cap, which covers the upper part of the tailgate, prevents direct permeance of water.

The hollow wall of the bed liner seal member has the upper end higher than the upper end of the installation plate member, and the hollow wall has the opening at the upper part. The upper end of the hollow wall has the part closer to the exterior of the automobile. The extended wall extends upward in the vertical direction from the part of the upper end of the hollow wall closer to the exterior of the automobile. When the shutter is in the closed position, the top edge of the extended wall contactlessly approaches the second horizontal surface, lower than the first horizontal surface, of the end cap. The extended wall as a first water cutting off member blocks part of water which permeates.

Water blocked by the extended wall is guided toward part of the extended wall closer to the rear part of the automobile body and is drained toward the exterior of the automobile from a lower part of the automobile body.

In this invention, it is only required that the top edge of the extended wall, which extends vertically, contactlessly approaches the second horizontal surface of the end cap. This invention, therefore, is capable of addressing some misalignment of the end cap, and eliminates the need for preciseness as in the related art for the end cap to touch each of first and second seal beads and third and fourth seal beads.

In addition, the extended installation member is provided on the upper part of the installation plate member of the bed liner seal member, the extended installation member extends toward the exterior of the automobile. The rear wall extends upward in the vertical direction from the upper end of the extended installation member. The front wall extends vertically and is closer to the front part of the automobile body than the rear wall. The front gutter wall is provided between the rear wall and the front wall. The rear wall and the front wall are lower than the extended wall. When the shutter is in the closed position, the top edge of the rear wall and the top edge of the front wall face and contactlessly approach the third horizontal surface, lower than the second horizontal surface. The rear wall as a second water cutting off member and the front wall as a third water cutting off member block part of water which further permeates.

Water that passes above the top edge of the extended wall and is blocked by the rear wall is guided into the hollow part and drained toward the exterior of the automobile from the lower part of the automobile body.

Water that passes above the top edge of the rear wall and is blocked by the front wall is guided into the front gutter wall provided between the rear wall and the front wall, and drained toward the exterior of the automobile from the lower part of the automobile body through the hollow part.

The rear lateral wall connects the first edges of the rear wall, the front gutter wall, and the front wall. The rear lateral wall prevents the part of water guided into the front gutter wall from splashing toward the interior of the automobile.

In addition, the lateral gutter wall extends toward the front part of the automobile body from the upper end of the installation plate member of the bed liner seal member. The inner peripheral wall is vertically provided between the part of the lateral gutter wall closer to the front part of the automobile body and the part of the lateral gutter wall closer to the interior of the automobile, the inner peripheral wall has the part closer to the front part of the automobile body continuous with the front lateral wall and the part closer to the rear part of the automobile body continuous with the hollow wall. The second edge of the front gutter wall is connected with an edge of the lateral gutter wall closer to the exterior of the automobile, to drain water guided into the front gutter wall toward the exterior of the automobile through the lateral gutter wall and the hollow part surrounded by the hollow wall. This configuration further prevents water from permeating the truck cargo bed.

In addition, the larger lip is provided on the top edge of the hollow wall of the bed liner seal member. The larger lip continuously extends alongside of the part of the hollow wall closer to the rear part of the automobile body, the part of the hollow wall closer to the interior of the automobile, and the inner peripheral wall. The inner peripheral wall extends vertically from the lateral gutter wall. The larger lip extends toward the inner side of the hollow wall. When the shutter is in the closed position, the part of the larger lip closer to the front part of the automobile body makes elastic contact with the lower surface of the rear end of the shutter, and the parts of the larger lip closer to the interior of the automobile and closer to the rear part of the automobile body make elastic contact with an edge of the shutter seal member closer to the exterior of the automobile. This configuration improves water cut off function at an inner-cabin side part of an upper side part of the bed liner seal member.

In addition, the smaller lip is provided on the upper part of the extended installation member of the bed liner seal member. The smaller lip protrudes toward the rear part of the automobile body, and has the extended wall connected with a base root of the smaller lip. When the shutter is in the closed position, the upper surface of the smaller lip makes elastic contact with the second horizontal surface of the end cap. This configuration improves water cut off function at an outer-cabin side part of the upper side part of the bed liner seal member.

In addition, the smaller lip extends upward and leans toward the rear part of the automobile body. The smaller lip guides the end cap when the shutter approaches the closed position, to prevent the end cap from getting caught by the smaller lip, and prevent the upper side part of the bed liner seal member from bending abnormally.

The smaller lip, which extends upward and leans toward the rear part of the automobile body, also prevents the end cap from getting caught by the smaller lip when the shutter approaches an opened position from the closed position.

In addition, the upper part of the hollow wall of the bed liner seal member is formed by die molding, and the extended wall widens gradually toward the upper part. This configuration allows an operator to pull out a core for die molding easily from an upper side after die molding, to improve operability.

DETAILED DESCRIPTION

Figure 1:
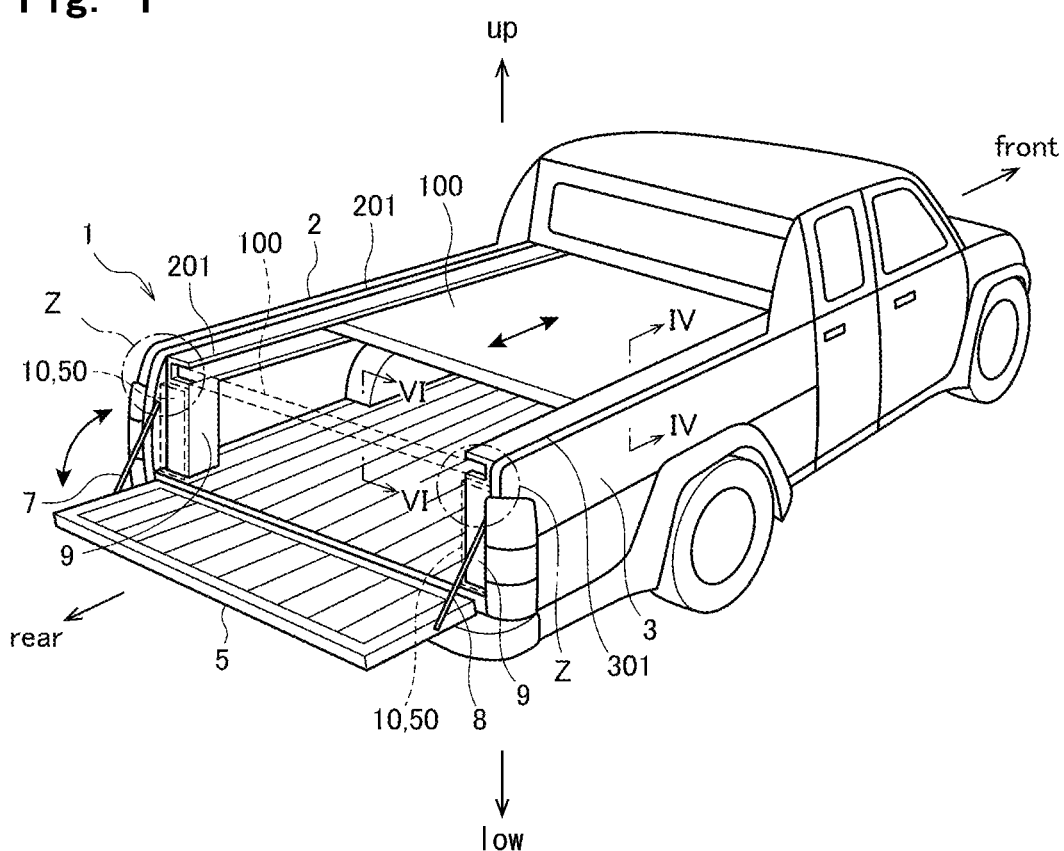
FIG. 1 is an external perspective view of a truck with a shutter.
Figure 2:
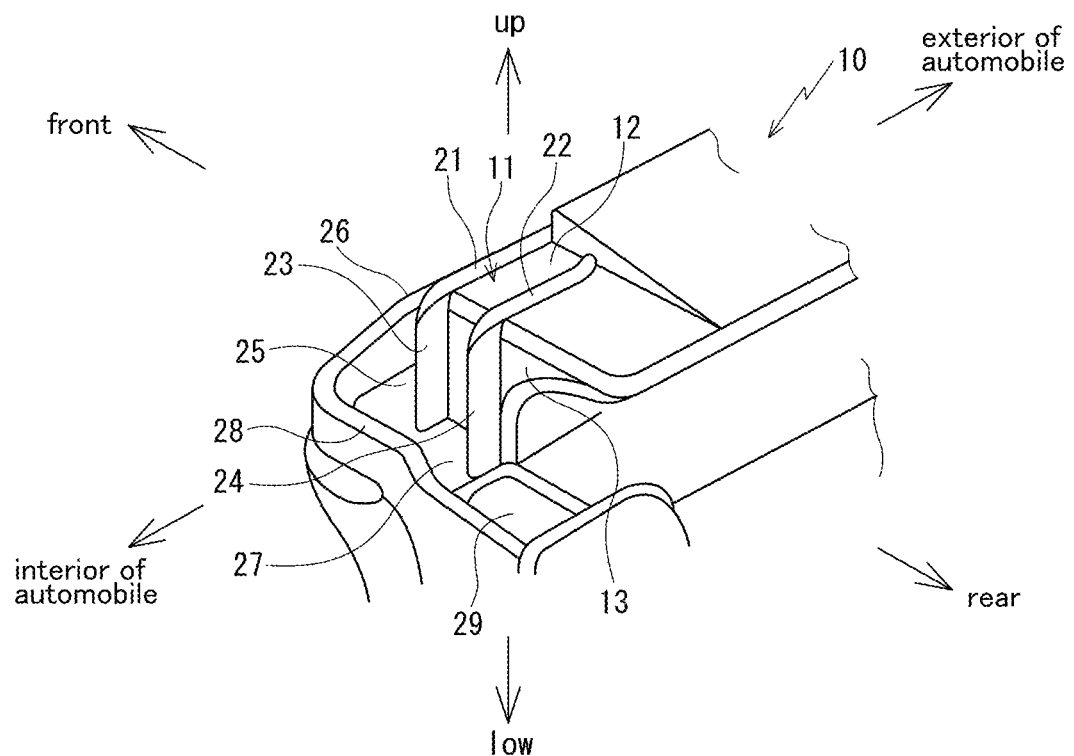
FIG. 2 is an enlarged perspective view of the principal components of a conventional bed liner seal member.
Figure 3:
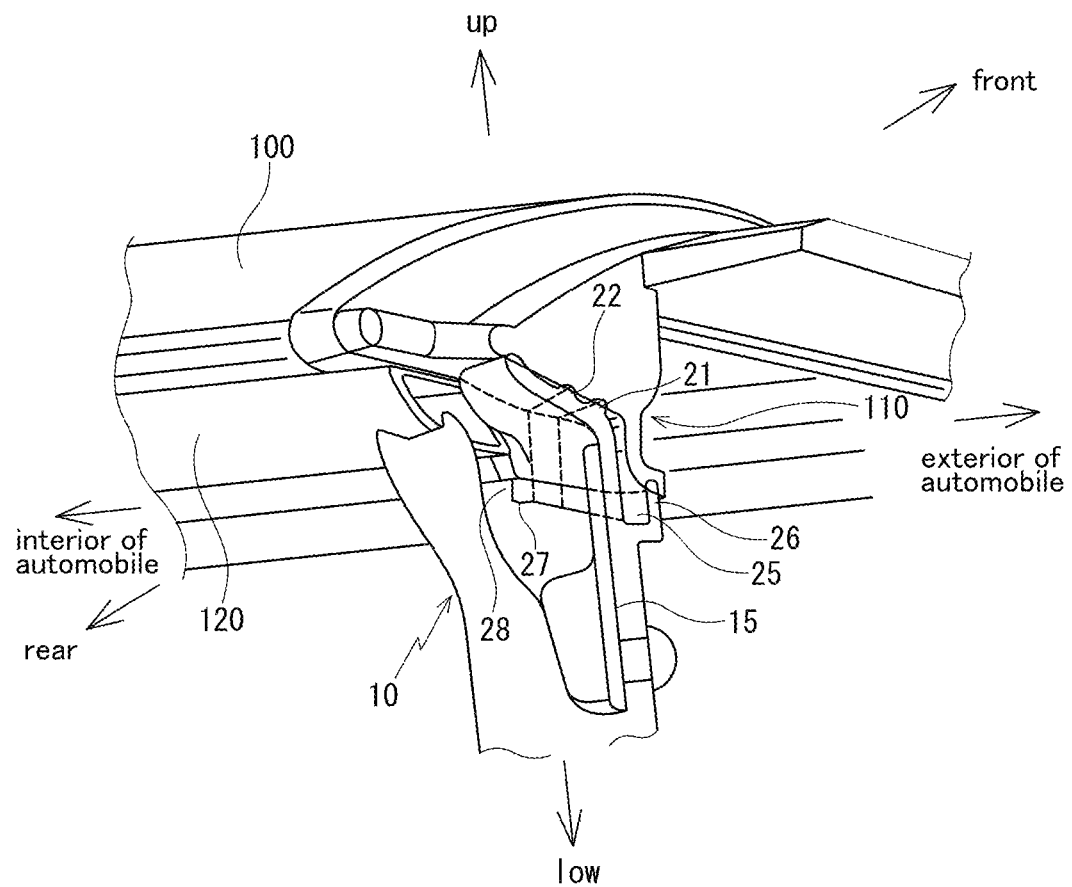
FIG. 3 is an enlarged perspective view of the principal components of the bed liner seal member illustrated in FIG. 2 and the shutter with the shutter extended toward a rear part of an automobile body and in elastic contact with the bed liner seal member.

Referring to the Drawings, a sealing structure according to an embodiment of the present invention for a truck cargo bed with a shutter will be described. When constituents or items correspond to those in prior arts, the same symbols are used.

The sealing structure is primarily for use on upper parts (part Z in FIG. 1) of left and right rear ends of a truck cargo bed 1 with a shutter 100 at an upper part of the truck cargo bed 1 as illustrated in FIG. 1. The shutter 100 extends in parallel with the truck cargo bed 1, and moves between at least two positions in a front-rear direction of an automobile body to open and close an opening at the upper part of the truck cargo bed 1.

The shutter 100 is made of metal including an aluminum plate. The shutter 100 couples to the upper part of the truck cargo bed 1 by a left track 201 and a right track 301. The left and right tracks 201, 301 are mounted on top edges of a left side wall 2 and a right side wall 3. The left and right side walls 2, 3 are vertically mounted on a left end and a right end of the truck cargo bed 1.

Figure 4:
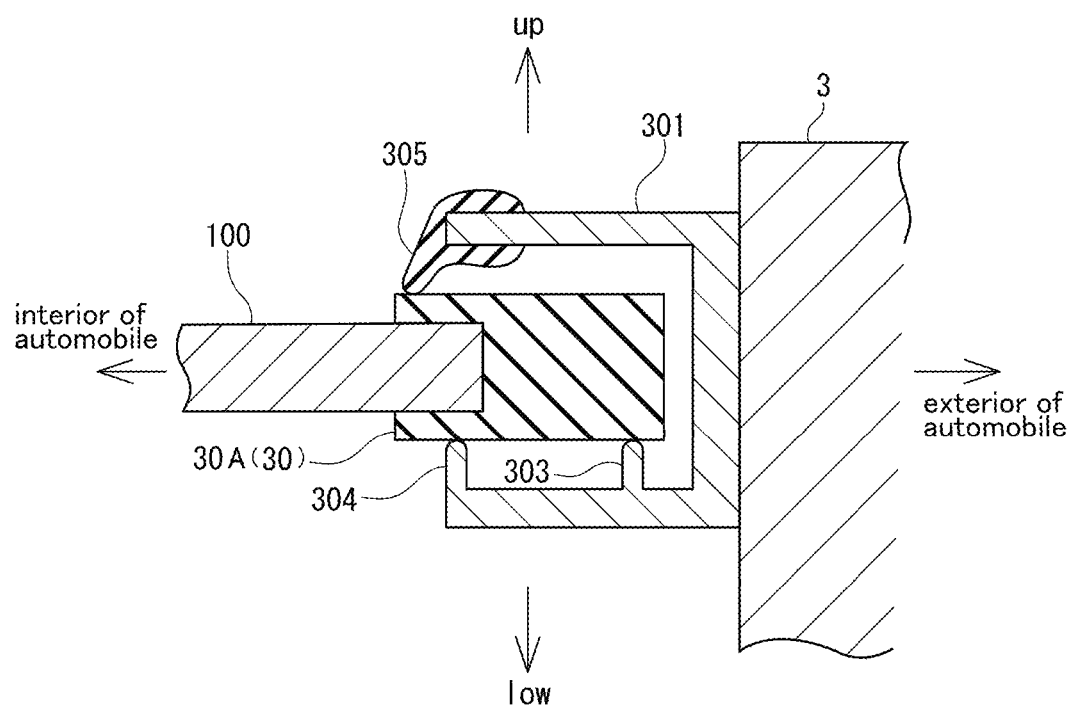
FIG. 4 is an enlarged cross-sectional view of a sealing structure according to an embodiment of the present invention take along line IV-IV in FIG. 1 for a truck cargo bed with a shutter.

As illustrated in FIG. 4, which is an enlarged cross-sectional view take along line IV-IV in FIG. 1, the right track 301 has a U-shaped cross section with an opening on an inner-cabin side of the right track 301. A sliding member 30A of an end cap 30 is fit on a right side surface of the shutter 100, and is inserted into the right track 301 from the opening. The end cap 30 is made of resin. Projections 303, 304 are provided on a lower part on an inner side of the right track 301 and support a lower surface of the sliding member 30A.

A seal lip 305 is provided on an end of an upper part on the inner side of the right track 301, and seals a space between the right track 301 and the sliding member 30A by making elastic contact with an upper surface of the sliding member 30A.

Illustration and explanations on the left track 201 are omitted for the left track 201 is symmetrical with the right track 301.

Figure 5:
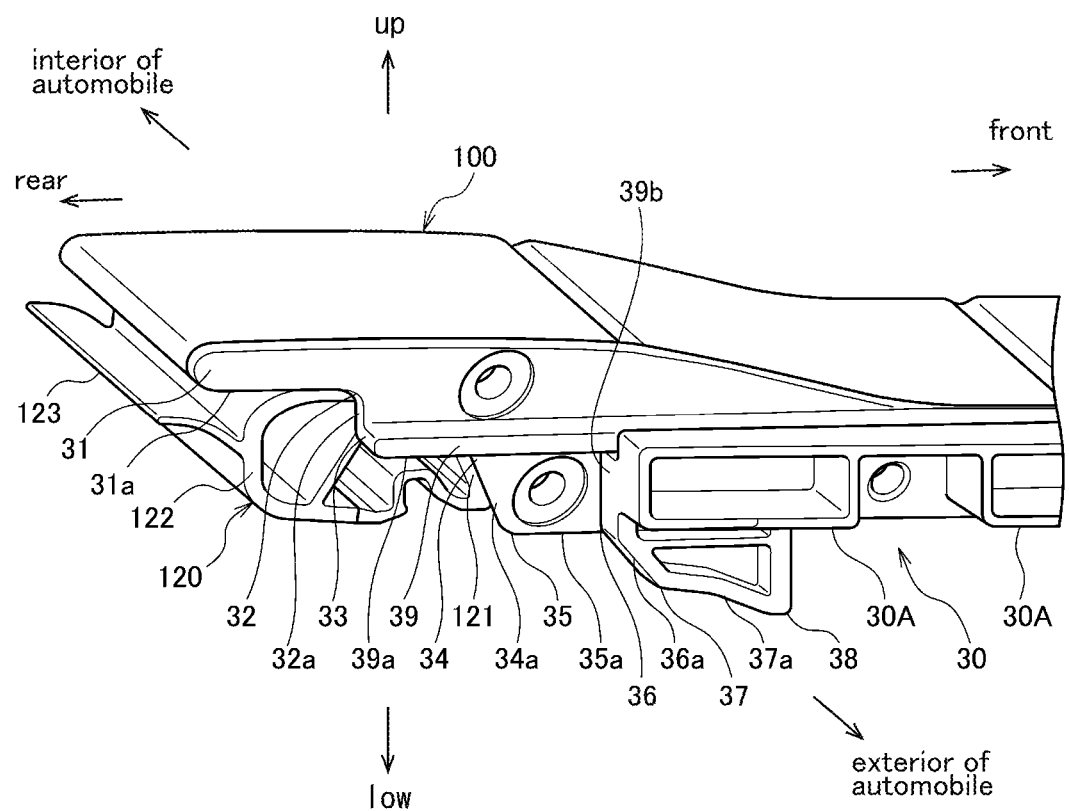
FIG. 5 is an enlarged perspective view of a side end of a rear part of the shutter in the sealing structure according to the embodiment of the present invention.

As illustrated in FIG. 5, the end cap 30 is fit on a side surface on a rear end of the shutter 100 and has a first convex shaped part 31. The first convex shaped part 31 protrudes toward a rear part of the automobile body in the same manner as a rear end of the shutter 100. The end cap 30 also has a second convex shaped part 33 lower than the first convex shaped part 31, a third convex shaped part 35 lower than the second convex shaped part 33, a fourth convex shaped part 37 lower than the third convex shaped part 35, and a fifth convex shaped part 38 lower than the fourth convex shaped part 37.

A first horizontal surface 31a extends toward a front part of the automobile body from a lower surface of the first convex shaped part 31 and has a first concave shaped part 32 on an end closer to the front part of the automobile body. A first vertical surface 32a extends downward from the first concave shaped part 32 and has the second convex shaped part 33 on a lower end.

A second horizontal surface 39a extends toward the front part of the automobile body and toward an exterior of an automobile relative to a side surface of the automobile body from the second convex shaped part 33. The second horizontal surface 39a has a sixth convex shaped part 39 on an end of the second horizontal surface 39a closer to the exterior of the automobile. The sixth convex shaped part 39 protrudes toward the exterior of the automobile.

The second horizontal surface 39a has a second concave shaped part 34 at a center. A first inclined plane 34a extends downward and diagonally toward the front part of the automobile body from the second concave shaped part 34. The first inclined plane 34a has a third convex shaped part 35 on a lower end. The third convex shaped part 35 has a third horizontal surface 35a on a lower surface which extends toward the front part of the automobile body.

The third horizontal surface 35a has a third concave shaped part 36 on an end closer to the front part of the automobile body. A second inclined plane 36a extends downward and diagonally toward the front part of the automobile body from the third concave shaped part 36. The second inclined plane 36a has a fourth convex shaped part 37 on a lower end. A third inclined plane 37a extends downward and diagonally toward the front part of the automobile body from the fourth convex shaped part 37.

The third inclined plane 37a has a fifth convex shaped part 38 on an end closer to the front part of the automobile body. A second vertical surface 39b connects an end of the second horizontal surface 39a closer to the front part of the automobile body with an upper end of the second inclined plane 36a.

The sliding member 30A extends toward the exterior of the automobile from an outer end of the second vertical surface 39b.

Figure 6:
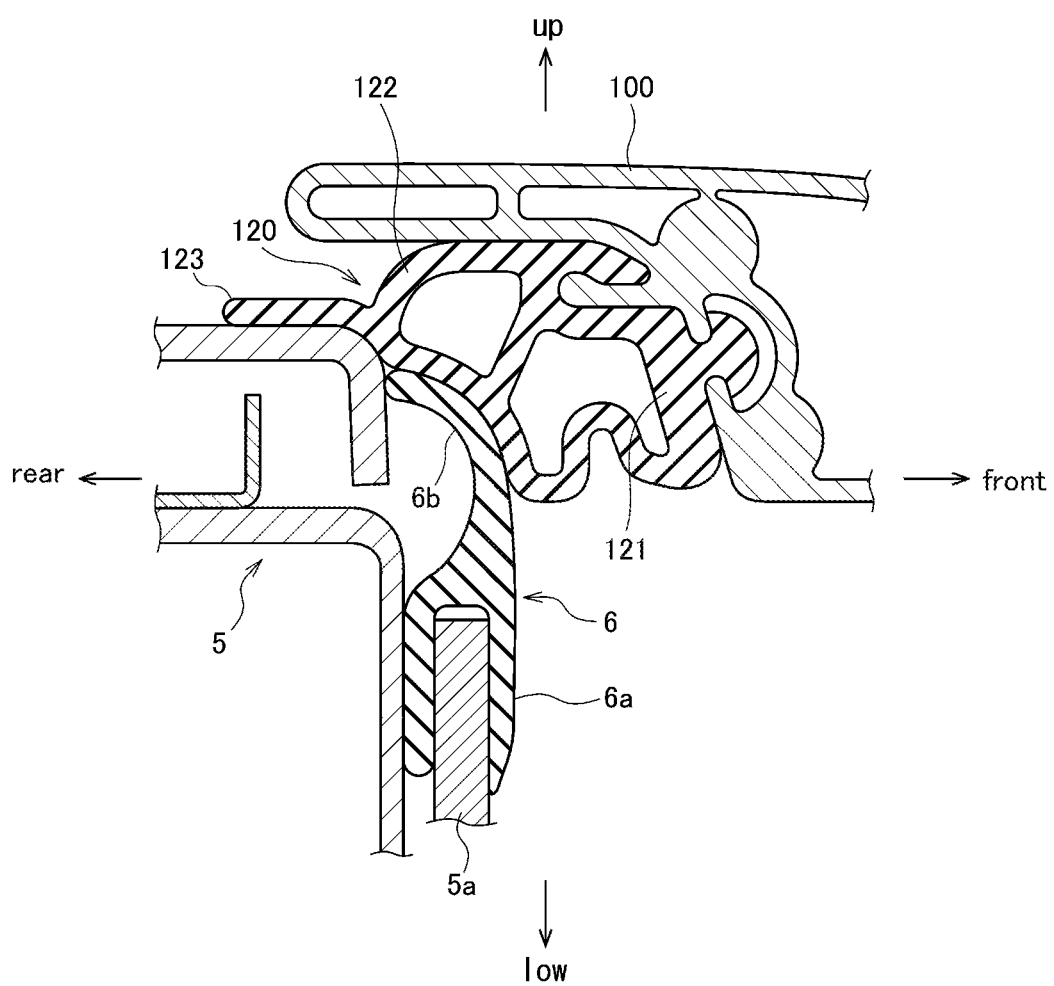
FIG. 6 is an enlarged cross-sectional view of the sealing structure according to the embodiment of the present invention take along line VI-VI in FIG. 1 with the shutter and a tailgate in closed positions.

As illustrated in FIG. 1 and FIG. 6, which is an enlarged side view taken along line VI-VI of FIG. 1, a tailgate 5 is mounted on a rear end of the truck cargo bed 1. A stay 7 connects a center of a left end of the tailgate 5 with a center of a rear end of the left side wall 2. A stay 8 connects a center of a right end of the tailgate 5 with a center of a rear end of the right side wall 3. The tailgate 5 is pivotal in the front-rear direction of the automobile body with a lower end part of the tailgate 5 as a pivotal axis. The tailgate 5 and the left and right side walls 2, 3 surround the truck cargo bed 1 when the tailgate 5 is in a closed position.

The shutter 100, when fully extended with the left and right side walls 2, 3 as well as the tailgate 5 surrounding the truck cargo bed 1, covers an entire opening of the truck cargo bed 1 as illustrated by a broken line in FIG. 1.

As illustrated in FIG. 6, a shutter seal member 120 is provided on the rear end of the shutter 100. The shutter seal member 120 faces downward, is hollow, and extends in a right-left direction of the automobile body. The shutter seal member 120 includes an installation base member 121, a hollow seal part 122, and a seal lip 123. The installation base member 121 couples to the shutter 100. The hollow seal part 122 is integrally formed with the installation base member 121. The seal lip 123 extends toward the rear part of the automobile body. The shutter seal member 120 makes elastic contact with a tailgate seal member 6 when the tailgate 5 is in the closed position and prevents permeation of water through a space between the shutter 100 and the tailgate 5. The tailgate seal member 6 couples to an upper part of an installation flange 5a of the tailgate 5. The tailgate seal member 6 includes an installation base member 6a and a seal lip 6b. The installation base member 6a has a U-shape with an opening facing downward. The seal lip 6b extends from an upper wall of the installation base member 6a and makes elastic contact with the hollow seal member 122 of the shutter seal member 120 directly. The seal lip 123 makes elastic contact with an upper part of the tailgate 5 from an upper side.

As illustrated in FIG. 1, a bed liner 9 is provided on the rear ends of the left and right side walls 2, 3. The bed liner 9 protrudes toward an inner side of the truck cargo bed 1. A bed liner seal member 50 illustrated in FIGS. 7 to 10 is provided on a rear side surface of the bed liner 9.

Figure 7:
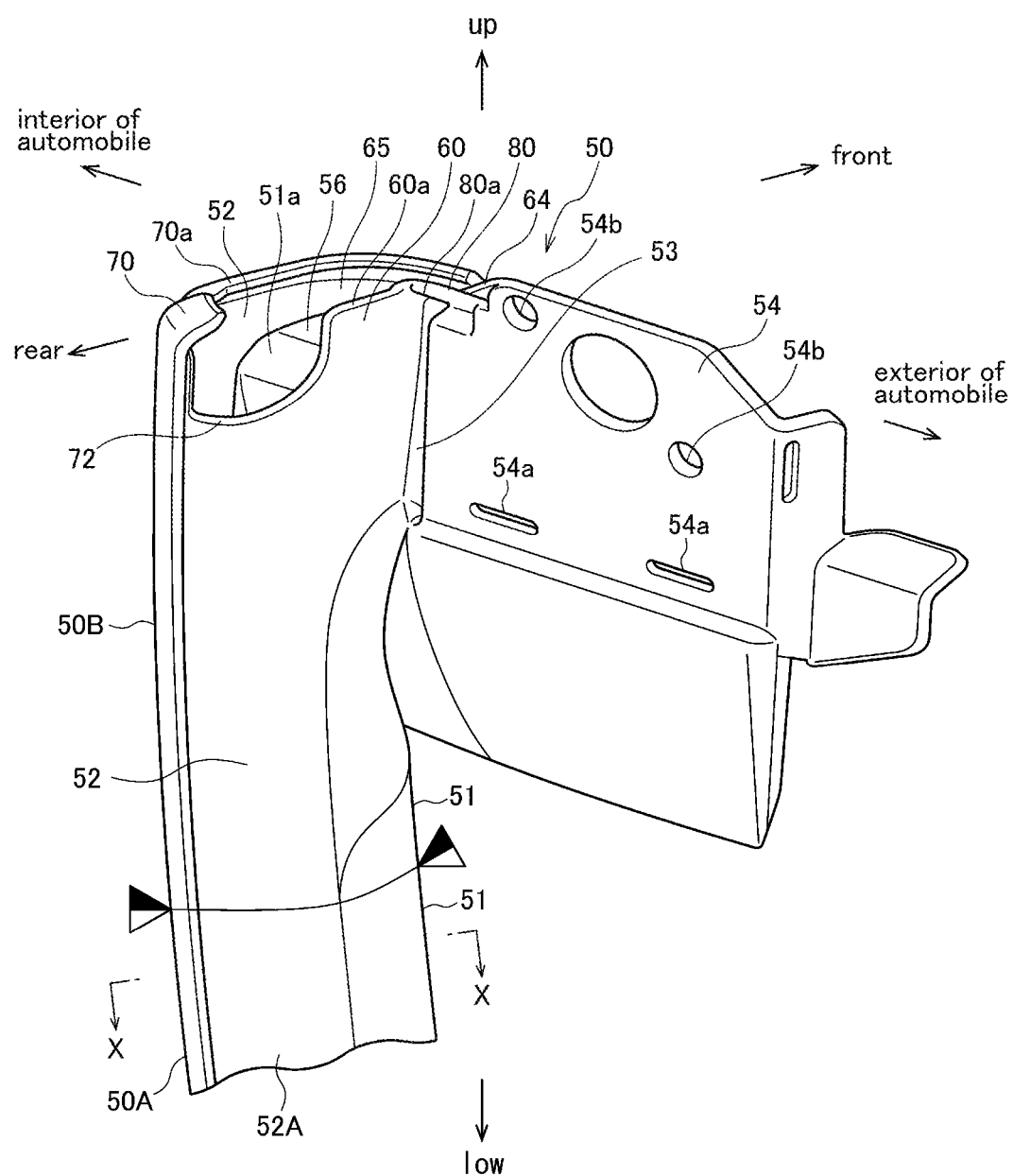
FIG. 7 is an enlarged perspective view of the principal components of the bed liner seal member in the sealing structure according to the embodiment of the present invention with the principal components seen from the rear part of the automobile body and diagonally above and with an outsert removed.

As illustrated in FIG. 7, the bed liner seal member 50 includes an extrusion-molded part 50A as a lower side part formed by extrusion molding and a die-molded part 50B as an upper side part formed by die molding, which are integrally connected.

Figure 10:
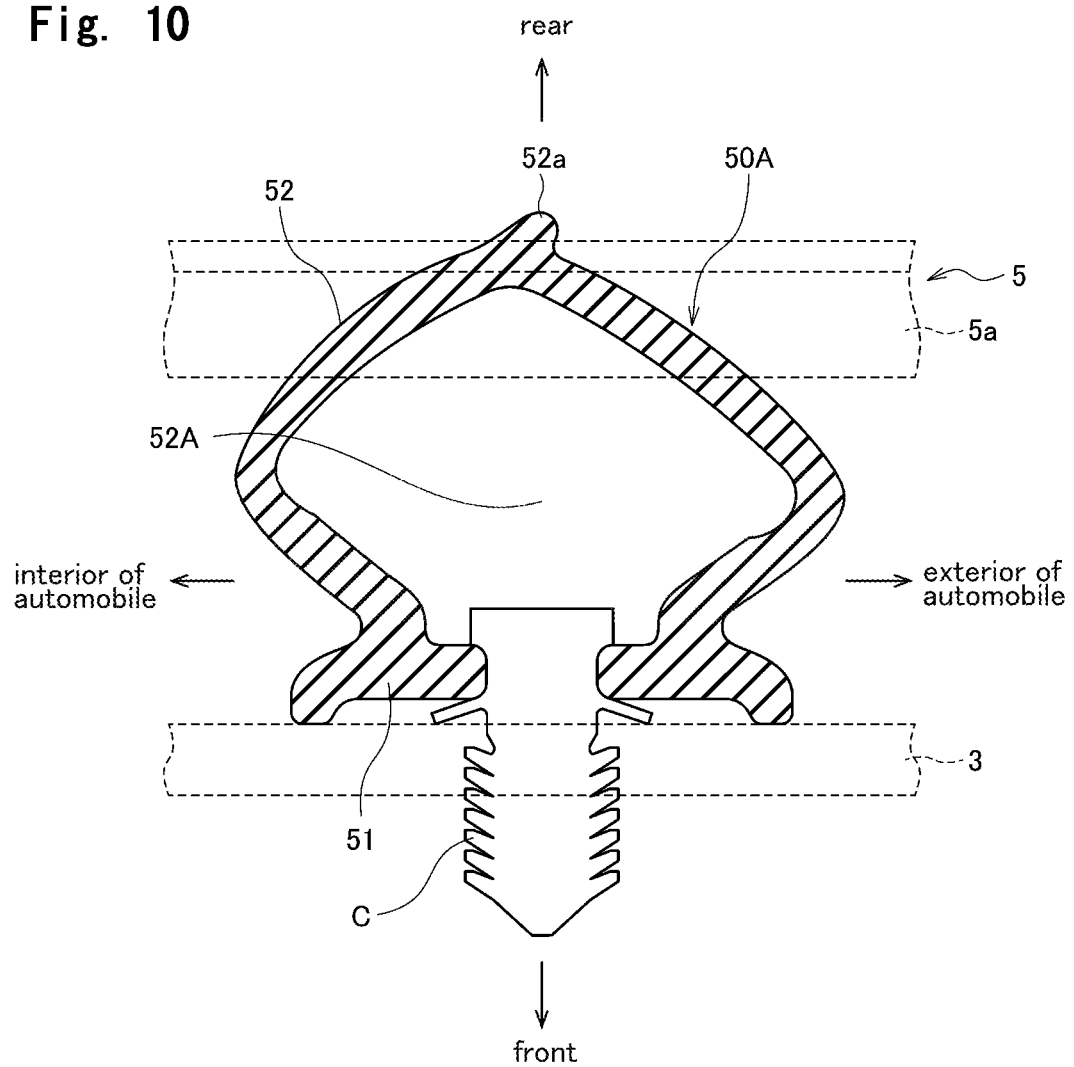
FIG. 10 is an enlarged cross-sectional view taken along line X-X of FIG. 7.

As illustrated in FIG. 10, which is an enlarged cross-sectional view taken along line X-X of FIG. 7, the extrusion-molded part 50A includes an installation plate member 51 and a hollow wall 52. The installation plate member 51 extends in an upper-lower direction of the automobile body and is fixed on the rear ends of the left and right side walls 2, 3 by clips C provided at intervals. The hollow wall 52 is integrally formed with the installation plate member 51, and has a substantially pantograph shape. The hollow wall 52 includes a smaller protrusion 52a which extends toward the rear part of the automobile body from an apex at a center of the pantograph shape. The smaller protrusion 52a makes elastic contact with a center of the installation flange 5a when the tailgate 5 is in the closed position and prevents permeation of water through a space between the tailgate 5 and the rear ends of the left and right side walls 2, 3.

In FIG. 7, a black side part of black-white triangles indicates the die-molded part 50B and a white side part indicates the extrusion-molded part 50A. The extrusion-molded part 50A has a second die-molded part (illustration omitted) on a lower side part. The second die-molded part has a drain hole to drain water guided into a hollow part 52A toward the exterior of the automobile.

Figure 8:
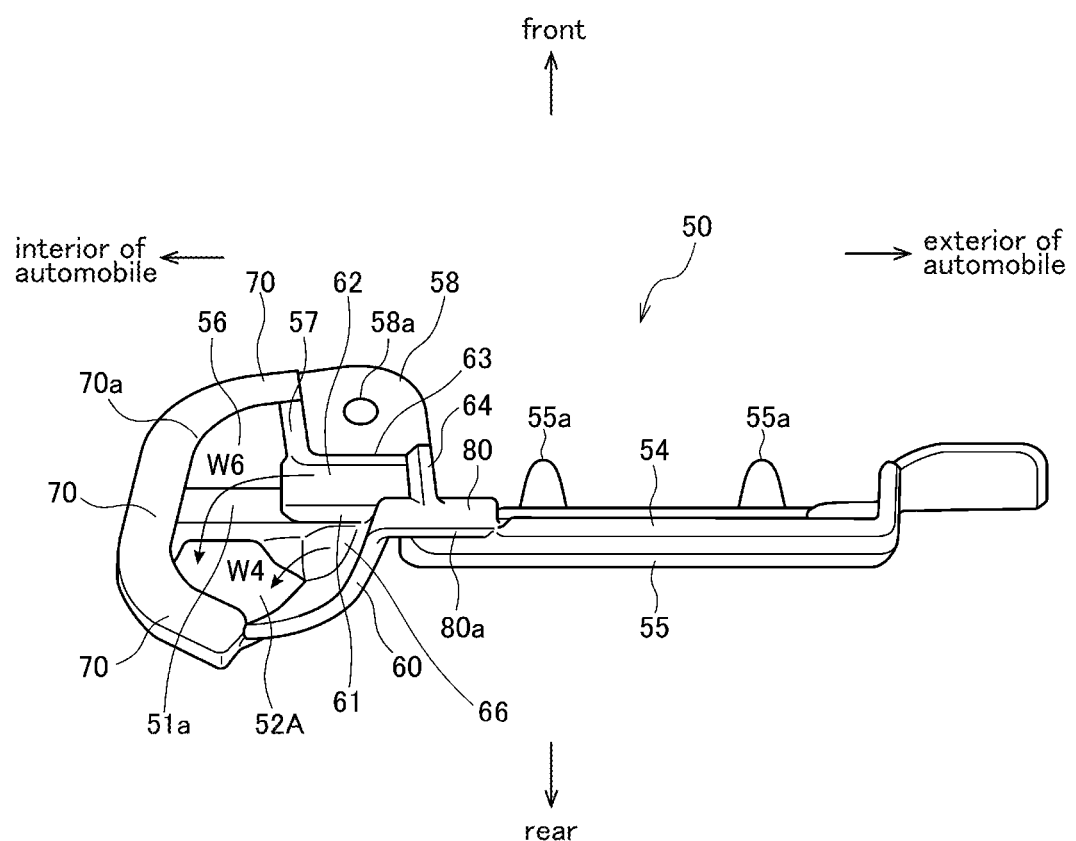
FIG. 8 is a plan view of the bed liner seal member illustrated in FIG. 7 with the outsert embedded.

As illustrated in FIGS. 7 and 8, the hollow wall 52 of the die-molded part 50B surrounds the hollow part 52A, and extends upward. The hollow wall 52 has an opening at an upper part, and has an upper end higher than an upper end 51a of the installation plate member 51. The upper end of the hollow wall 52 has part closer to the exterior of the automobile.

An extended installation member 53 is provided on an upper part of the installation plate member 51. The extended installation member 53 extends toward the exterior of the automobile. An installation member 54 is connected to an end of the extended installation member 53. The installation member 54 attaches the bed liner seal member 50 to the rear ends of the left and right side walls 2, 3. The installation member 54 has an outsert 55 embedded on a rear side surface. In FIG. 7, the outsert 55 is removed from the installation member 54. The outsert 55 has hooks (illustration omitted) provided on a lower side part. The hooks are inserted in first holes 54a provided on a lower side part of the installation member 54 and are fixed. As illustrated in FIG. 8, the outsert 55 has two clips 55a on an upper side part. The clips 55a are inserted in second holes 54b provided on an upper side part of the installation member 54. This fixes the outsert 55 on the rear side surface of the bed liner seal member 50.

Figure 11:
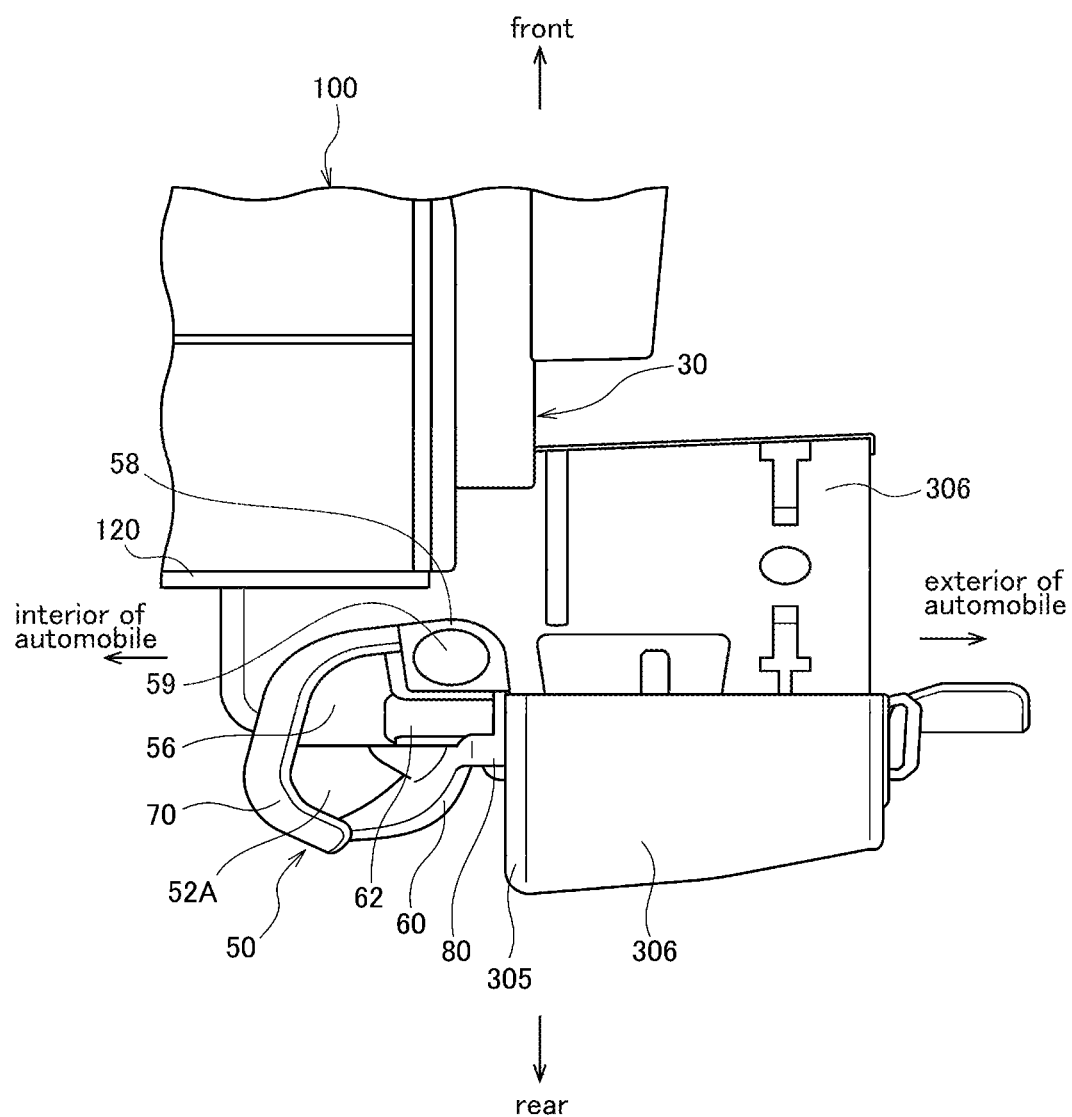
FIG. 11 is an enlarged plan view of the shutter illustrated in FIG. 1 extended toward the rear part of the automobile body and just before making elastic contact with the bed liner seal member illustrated in FIG. 7.
Figure 12:
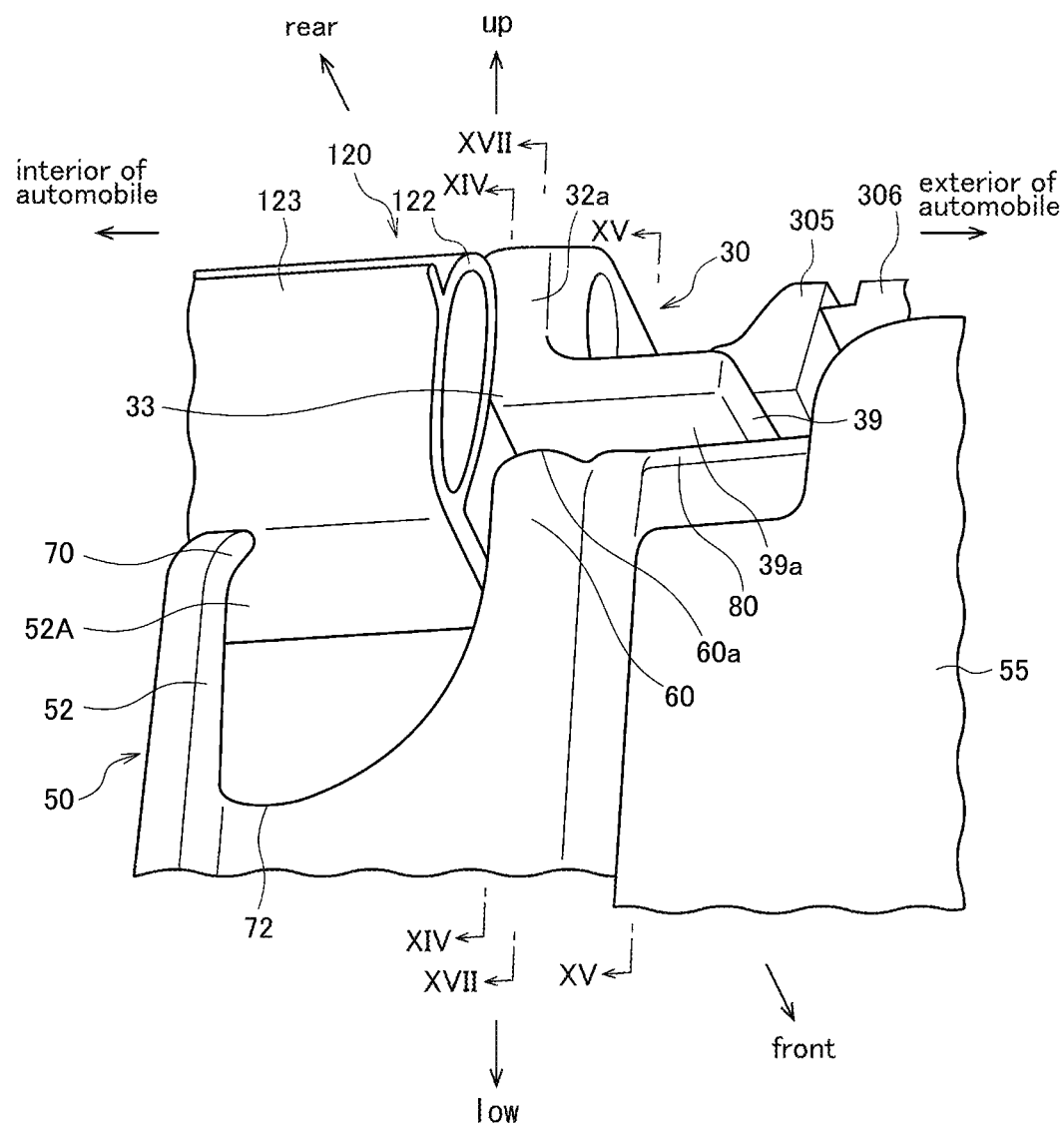
FIG. 12 is an enlarged perspective view of the principal components of the shutter illustrated in FIG. 1 and the bed liner seal member illustrated in FIG. 7 with the shutter extended toward the rear part of the automobile body and in elastic contact with the bed liner seal member, with the outsert embedded, and with the components seen from the rear part of the automobile body and diagonally below.
Figure 13:
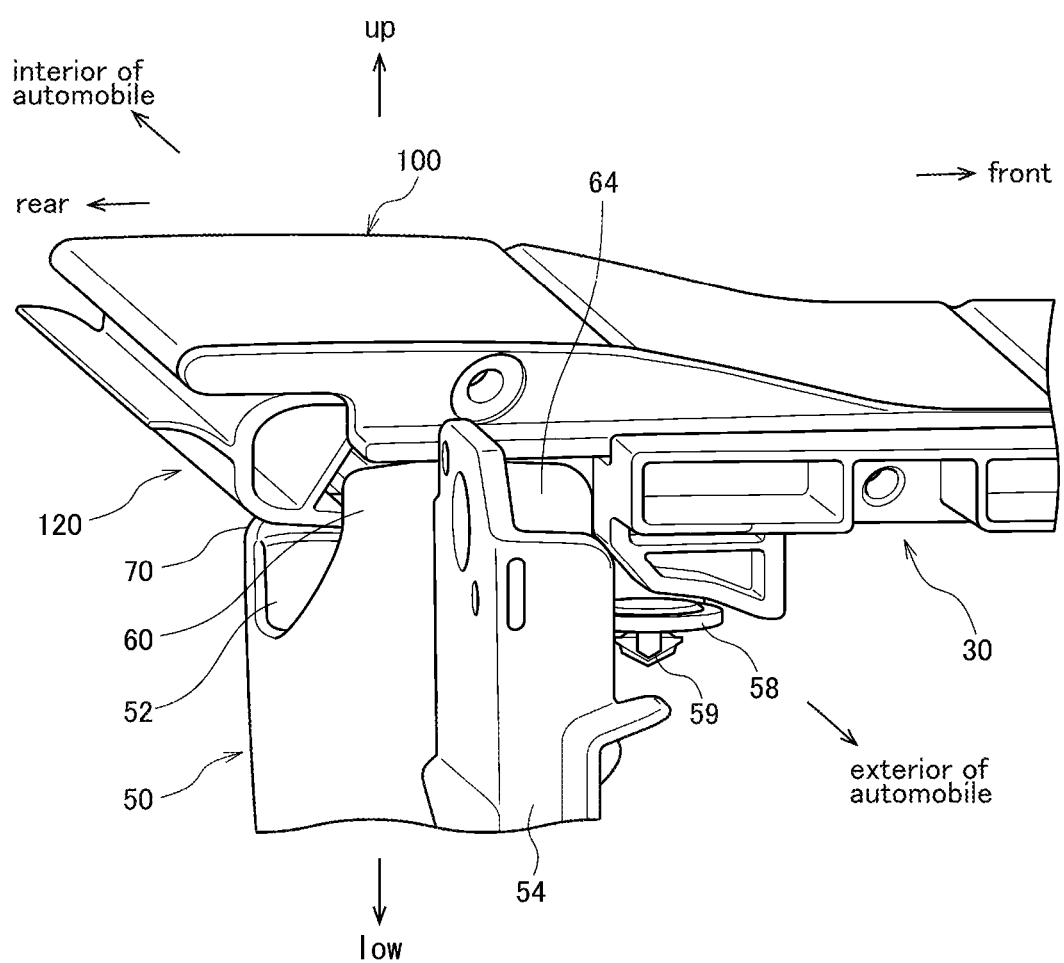
FIG. 13 is an enlarged perspective view of the principal components of the shutter illustrated in FIG. 1 and the bed liner seal member illustrated in FIG. 7 with the shutter extended toward the rear part of the automobile body and in elastic contact with the bed liner seal member, and with the components seen from a side surface of the automobile body.

A lateral gutter wall 56 extends toward the front part of the automobile body from the upper end 51a. A horizontal plate 58 is provided closer to the exterior of the automobile than the lateral gutter wall 56 across a front lateral wall 57. The front lateral wall 57 extends vertically, and has a wall surface in an inner-cabin and outer-cabin direction. In other words, a direction perpendicular to the wall surface of the front lateral wall 57 corresponds to the front-rear direction. The horizontal plate 58 has a hole 58a at a center. As illustrated in FIG. 11, a clip 59 is inserted in the hole 58a to fix the bed liner seal member 50 on an upper surface of an end cap 306 for the right track. The end cap 306 as well as the right track 301 is fit on the right side wall 3 (illustration omitted). As illustrated in FIGS. 11 and 12, the seal lip 305 is provided on the end cap 306. The clip 59 is illustrated in FIGS. 11, 13, and 14 to be discussed later.

As illustrated in FIG. 7, an extended wall 60 extends upward in a vertical direction from the part of the upper end of the hollow wall 52 of the die-molded part 50B closer to the exterior of the automobile. The extended wall 60 widens gradually toward an upper part.

Figure 14:
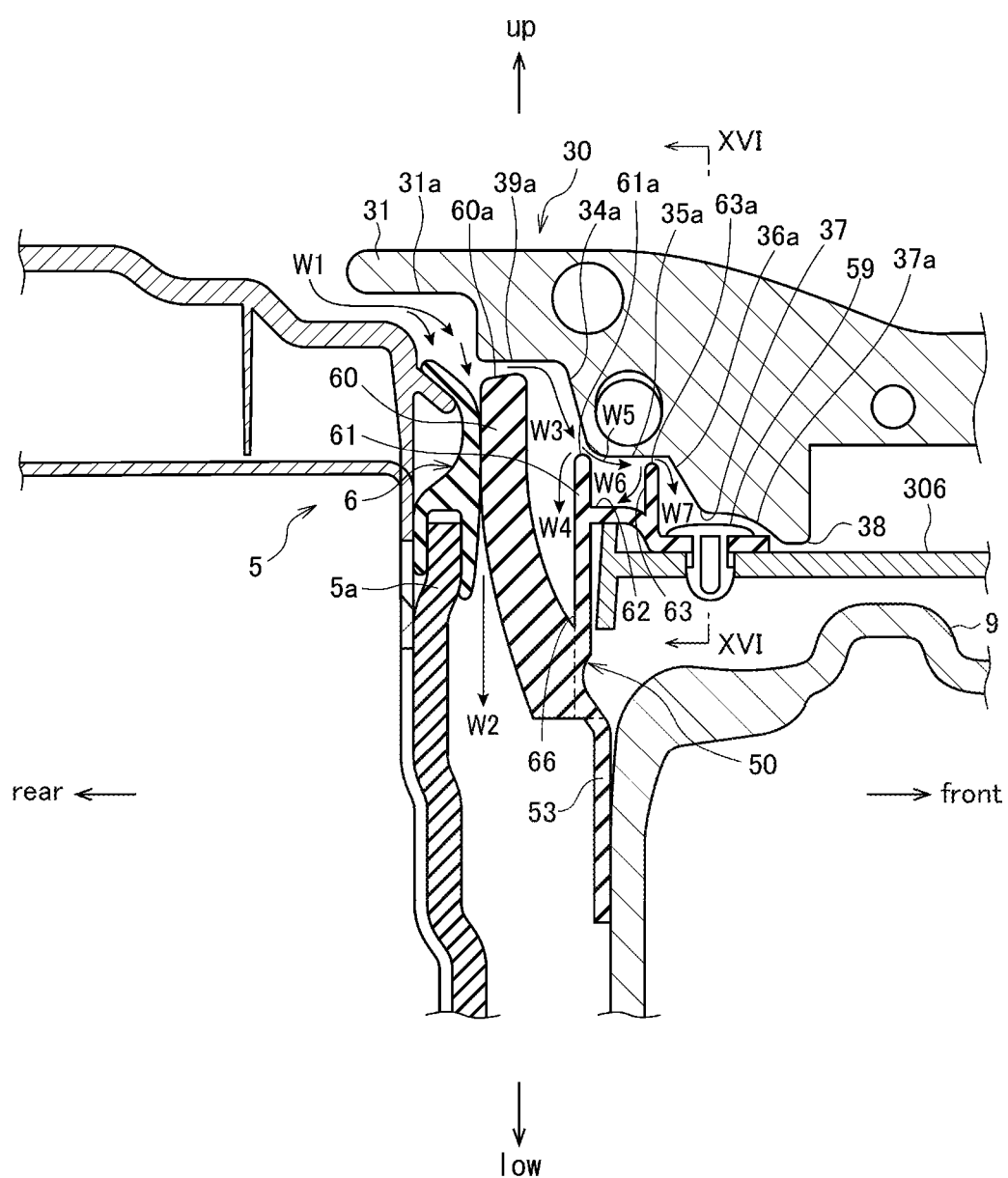
FIG. 14 is an enlarged cross-sectional view of the principal components of the shutter illustrated in FIG. 1 and the bed liner seal member illustrated in FIG. 7 taken along line XIV-XIV of FIG. 12 with the shutter extended toward the rear part of the automobile body and in elastic contact with the bed liner seal member.

As illustrated in FIG. 14, which is an enlarged cross-sectional view taken along line XIV-XIV of FIG. 12, a rear wall 61 extends upward in the vertical direction from an upper end of the extended installation member 53. The rear wall 61 has a wall surface in the front-rear direction of the automobile body. In other words, a direction perpendicular to the wall surface of the rear wall 61 corresponds to the inner-cabin and outer-cabin direction. The rear wall 61 has a top edge 61a and a first edge closer to the exterior of the automobile. A front gutter wall 62 extends toward the front part of the automobile body from the middle of the rear wall 61, and the front gutter wall 62 gradually lowers toward an interior of the automobile relative to a side surface of the automobile body. The front gutter wall 62 has a first edge closer to the exterior of the automobile and a second edge closer to the interior of the automobile. A front wall 63 extends upward in the vertical direction from an end of the front gutter wall 62 closer to the front part of the automobile body, and the front wall 63 is parallel to the rear wall 61. The front wall 63 has a top edge 63a, a first edge closer to the exterior of the automobile, and a second edge closer to the interior of the automobile. The front gutter wall 62 has an upper surface lower than an upper surface of the rear wall 61, closer to the rear part of the automobile body than the front gutter wall 62, and an upper surface of the front wall 63, closer to the front part of the automobile body than the front gutter wall 62.

As illustrated in FIG. 8, a rear lateral wall 64 connects the first edge of a side surface of the rear wall 61, the first edge of a side surface of the front gutter wall 62, and the first edge of a side surface of the front wall 63. The rear lateral wall 64 extends upward in the vertical direction, and is higher than the rear wall 61 and the front wall 63.

The front lateral wall 57 has an edge closer to the rear part of the automobile body continuous with the second edge of the front wall 63. The front lateral wall 57 is as high as the front wall 63 (illustration omitted).

Figure 9:
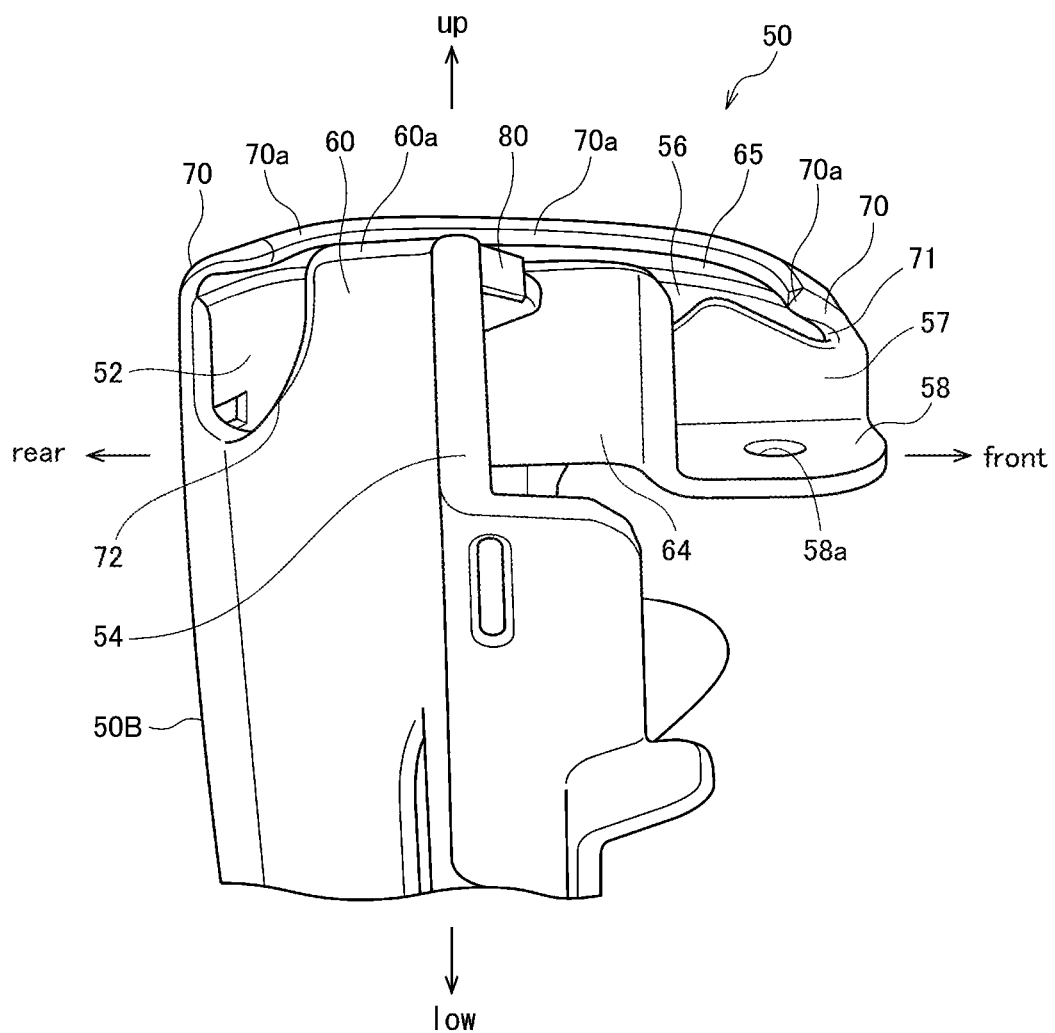
FIG. 9 is a right-side view of the bed liner seal member illustrated in FIG. 7 with the outsert removed.

As illustrated in FIG. 9, an inner peripheral wall 65 is vertically provided between part of the lateral gutter wall 56 closer to the front part of the automobile body and part of the lateral gutter wall 56 closer to the interior of the automobile body. The inner peripheral wall 65 has part closer to the front part of the automobile body continuous with an edge of the front lateral wall 57 closer to the front part of the automobile body, and part closer to the rear part of the automobile body continuous with the hollow wall 52.

As illustrated in FIG. 8, the second edge of the front gutter wall 62 is connected with the edge of the lateral gutter wall 56 closer to the exterior of the automobile, to drain water W6 guided into the front gutter wall 62 toward the exterior of the automobile through the lateral gutter wall 56 and the hollow wall 52. Water W6 is illustrated more in detail in FIG. 14. In this embodiment, the second edge of the front gutter wall 62, which lowers gradually toward the interior of the automobile (illustration omitted), is slightly higher than the lateral gutter wall 56 (illustration omitted). In some embodiments, the second edge of the front gutter wall 62 is as high as the lateral gutter wall 56.

As illustrated in FIGS. 7 and 9, a larger lip 70 is provided on a top edge of the hollow wall 52. The larger lip 70 continuously extends alongside of part of the top edge of the hollow wall 52 closer to the rear part of the automobile body, part of the top edge of the hollow wall 52 closer to the interior of the automobile relative to the side surface of the automobile body, and the inner peripheral wall 65. The inner peripheral wall 65 extends vertically from the lateral gutter wall 56. The larger lip 70 extends toward an inner side of the hollow wall 52. The larger lip 70 has a tip 70a. The tip 70a is curved to turn backward on part of the larger lip 70 closer to the front part of the automobile body, outward relative to the side surface of the automobile body at a center of the larger lip 70, and frontward on part of the larger lip 70 closer to the rear part of the automobile body. The larger lip 70 gradually leans upward while extending toward the inner side of the hollow wall 52.

As illustrated in FIG. 9, a smaller concave shaped part 71 is provided between the front lateral wall 57 and a front edge of the larger lip 70. The smaller concave shaped part 71 has a V shape of which apex extends toward the front part of the automobile body and diagonally downward. A larger concave shaped part 72 is provided on part of the extended wall 60 closer to the rear part of the automobile body. The larger concave shaped part 72 has a deeper notch than the smaller concave shaped part 71, and has a V shape of which apex extends downward. The apex of the larger concave shaped part 72 is lower than a top edge of the larger lip 70 substantially by 10 mm.

The smaller concave shaped part 71 and the larger concave shaped part 72 partially decrease rigidity of the hollow wall 52. This configuration allows an operator to pull out a core for die molding easily from an upper side after die molding, to improve operability. The extended wall 60, which widens gradually toward the upper part as illustrated in FIG. 8, allows for omission or formation of at least one of the smaller concave shaped part 71 and the larger concave shaped part 72.

Figure 15:
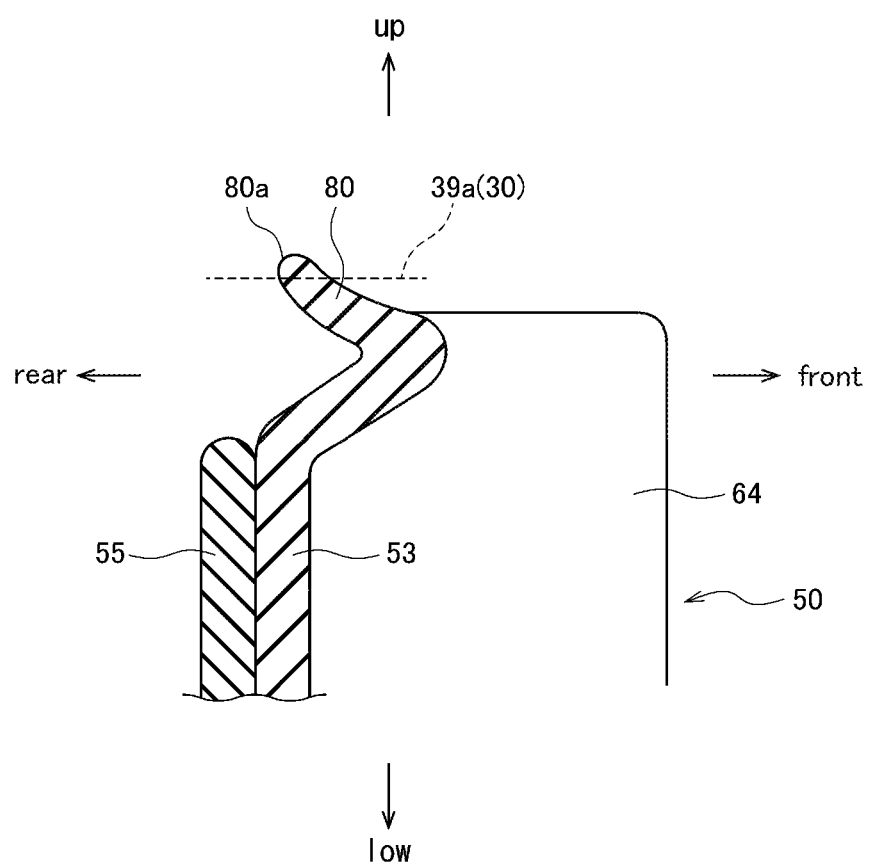
FIG. 15 is an enlarged cross-sectional view of a smaller lip and its surroundings taken along line XV-XV of FIG. 12 as the principal components with the shutter illustrated in FIG. 1 extended toward the rear part of the automobile body and in elastic contact with the bed liner seal member illustrated in FIG. 7.

As illustrated in FIG. 9 and FIG. 15, which is an enlarged cross-sectional view taken along line XV-XV of FIG. 12, a smaller lip 80 is provided on an upper part of the extended installation member 53, that is closer to the rear part of the automobile body than the rear lateral wall 64. The smaller lip 80 protrudes toward the rear part of the automobile body. The smaller lip 80 has an edge of the extended wall 60 closer to the front part of the automobile body connected with the smaller lip 80. As illustrated in FIG. 9, the smaller lip 80 gradually extends upward while leaning toward the rear part of the automobile body.

Figure 17:
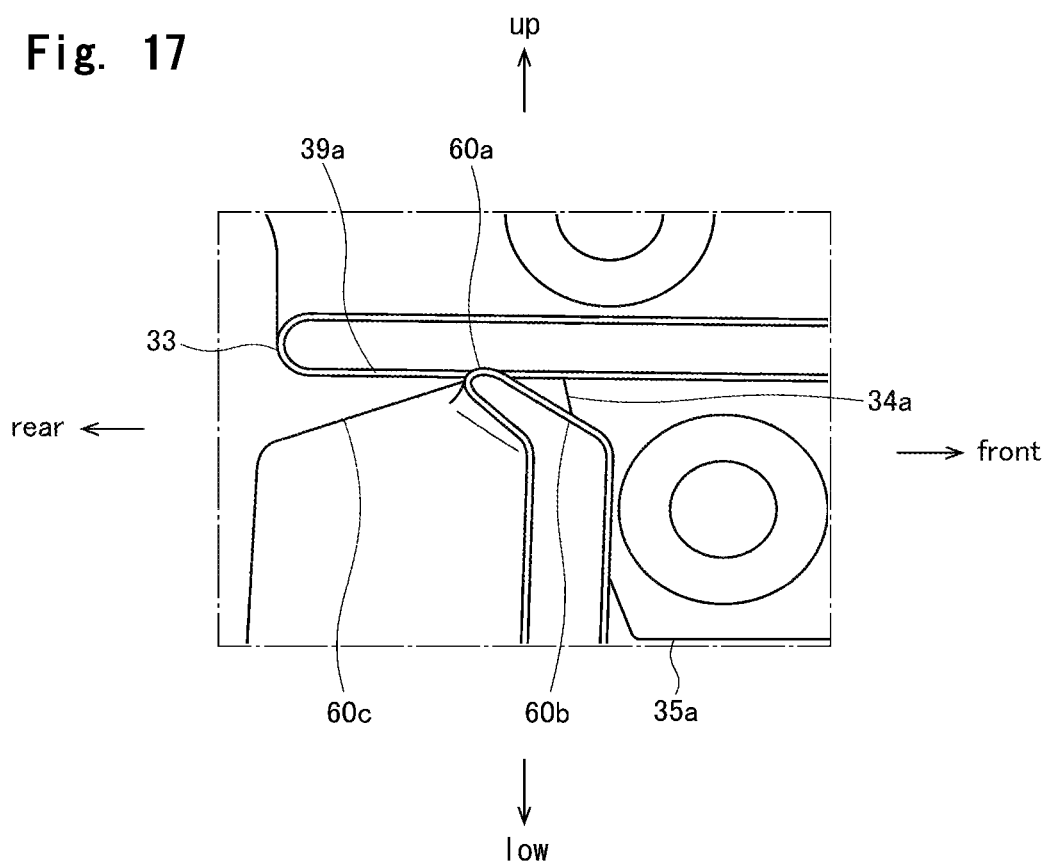
FIG. 17 is an enlarged cross-sectional view of the principal components of the shutter illustrated in FIG. 1 and the bed liner seal member illustrated in FIG. 7 taken along line XVII-XVII of FIG. 12 with the shutter extended toward the rear part of the automobile body and in elastic contact with the bed liner seal member.

As illustrated in FIG. 12 and FIG. 17, which is an enlarged cross-sectional view taken along line XVII-XVII of FIG. 12, the extended wall 60 has a top edge 60*a*, an upper inclined part 60*b*, and a lower inclined part 60*c*. The upper inclined part 60*b*, in the same manner as the smaller lip 80, extends upward to the top edge 60*a* from a base root of the smaller lip 80 and leans toward the rear part of the automobile body.

The upper inclined part 60*b* guides the end cap 30 when the shutter 100 approaches the closed position, to prevent the end cap 30 from getting caught by the extended wall 60, and prevent the upper side part of the bed liner seal member 50 from bending abnormally. The lower inclined part 60*c* extends downward and leans toward the rear part of the automobile body from the top edge 60*a*. The lower inclined part 60*c* prevents the end cap 30 from getting caught by the extended wall 60 when the shutter 100 approaches an opened position from the closed position. A lower end of the lower inclined part 60*c* connects with the larger concave shaped part 72.

As illustrated in FIGS. 7 and 12, an upper corner part on an inner-cabin side of the outsert 55 is cut out. The upper corner part is where the smaller lip 80 is provided.

Material for use as the bed liner seal member 50 includes rubber-like elastic body. Examples of the rubber-like elastic body include synthetic rubber material such as EPDM. Examples of the rubber-like elastic body also include thermoplastic resin such as olefinic thermoplastic resin. The rubber-like elastic body may be foamed or non-foamed depending on hardness of the material. Alternatively, foamed rubber-like elastic body or non-foamed rubber-like elastic body may be chosen according to a position in the sealing structure.

The shutter seal member 120 and the tailgate seal member 6 may be made of the same material as the bed liner seal member 50.

An extra member high in rigidity may be embedded in the installation base member 6*a*.

Figure 16:
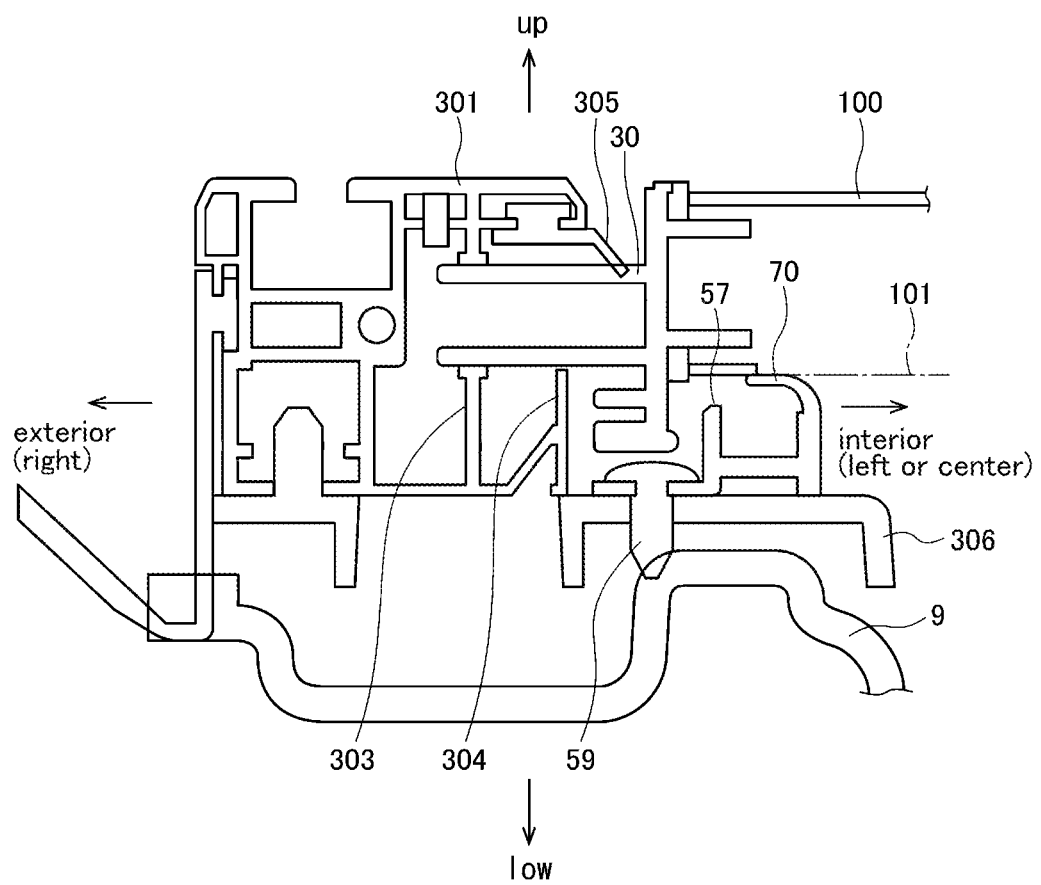
FIG. 16 is an enlarged cross-sectional view of part of a larger lip closer to a front part of the automobile body and its surroundings taken along line XVI-XVI of FIG. 14 as the principal components with the shutter illustrated in FIG. 1 extended toward the rear part of the automobile body and in elastic contact with the bed liner seal member illustrated in FIG. 7.

When the shutter 100 closes the opening of the truck cargo bed 1 as illustrated in FIGS. 12 to 14 after the shutter 100 is extended toward the rear part of the automobile body from the front part as illustrated in FIG. 11, the shutter seal member 120, provided on the rear end of the shutter 100, and a horizontal surface 101 make elastic contact with the larger lip 70, provided on the top edge of the hollow wall, from the upper side. Specifically, the shutter seal member 120 makes elastic contact with the parts of the larger lip 70 at a center closer to the interior of the automobile and closer to the rear part of the automobile body as illustrated in FIGS. 12 and 13. The horizontal surface 101 makes elastic contact with the part of the larger lip 70 closer to the front part of the automobile body as illustrated in FIG. 16, which is an enlarged cross-sectional view taken along line XVI-XVI of FIG. 14. The horizontal surface 101 is provided on a lower part of a main body of the shutter 100. The main body extends toward the inner side of the shutter 100 from the side surface to which the end cap 30 couples.

This configuration improves water cut off function at an inner-cabin side part of the die-molded part 50B.

In addition, as illustrated in FIGS. 12 and 15, the second horizontal surface 39*a* makes elastic contact with an upper surface of the smaller lip 80 from the upper side.

This configuration improves water cut off function at an outer-cabin side part of the die-molded part 50B.

In addition, when the shutter 100 is in the closed position as illustrated in FIG. 14, the top edge 60*a* at a center of the die-molded part 50B, illustrated in FIG. 12, faces and contactlessly approaches the second horizontal surface 39*a*. The second horizontal surface 39*a* is lower than the first horizontal surface 31*a*. In other words, distance between the top edge 60*a* and the second horizontal surface 39*a* is slight or zero touch, which is 0 mm of distance or overlap.

In addition, when the shutter 100 is in the closed position, the top edge 61*a* and the top edge 63*a* face and contactlessly approach the third horizontal surface 35*a*. The rear wall 61 and the front wall 63 are closer to the front part of the automobile body than the extended wall 60. The third horizontal surface 35*a* is lower than the second horizontal surface 39*a*. In other words, distance between the top edges 61*a*, 63*a* and the third horizontal surface 35*a* is slight or zero touch, which is 0 mm of distance or overlap.

In addition, a top edge of the clip 59, which fixes the bed liner seal member 50 on the upper surface of the end cap 306, contactlessly approaches the third inclined plane 37*a* and the fifth convex shaped part 38.

When the tailgate 5 is in the closed position with the shutter 100 fully extended, the tailgate seal member 6 inside the automobile body makes elastic contact with the shutter seal member 120 as illustrated in FIG. 6. Also, the tailgate 5 makes elastic contact with part of the hollow wall 52 of the extrusion-molded part 50A closer to the rear part of the automobile body as illustrated in FIG. 10.

As illustrated in FIGS. 12 and 14, the tailgate seal member 6 makes elastic contact with the surface of the extended wall 60 closer to the rear part of the automobile body at the center of the die-molded part 50B, where the shutter seal member 120 is absent. Also, the first horizontal surface 31*a* contactlessly covers an upper part of the tailgate 5 from the upper side with a slight distance. The tailgate seal member 6 on a position closer to the exterior of the automobile (illustration omitted) than FIG. 14 is out of contact with the surface of the extended wall 60 closer to the rear part of the automobile body.

In other words, the tailgate seal member 6 on a position illustrated in FIG. 14 makes elastic contact with the extended wall 60, which protrudes and is curved toward the rear part of the automobile body as illustrated in FIG. 8, by a short distance. The tailgate seal member 6 on the position closer to the exterior of the automobile than the short distance is out of contact with the extended wall 60.

As illustrated in FIGS. 14 and 8, when water W1 permeates through the space between the shutter 100 and the tailgate 5 when the tailgate 5 is in the closed position with the shutter 100 fully extended, the extended wall 60 of this embodiment as a first water cutting off member blocks part of water W1. The extended wall 60 is provided close to the second horizontal surface 39a. Water W2 as the part of water W1 drips from the position closer to the exterior of the automobile where the tailgate seal member 6 is out of contact with the extended wall 60, and is drained toward the exterior of the automobile.

In addition, the extended wall 60 makes elastic contact with the tailgate seal member 6 as illustrated in FIG. 14, while the hollow wall 52 of the extrusion-molded part 50A makes elastic contact with the tailgate 5 as illustrated in FIG. 10, which illustrates components on a position lower than FIG. 14. At the same time, the tailgate seal member 6 makes elastic contact with the hollow seal part 122 as illustrated in FIG. 6, which illustrates components on a position closer to the interior of the automobile than FIG. 14. This configuration prevents permeation of water W2 toward the interior of the automobile. The rear wall 61, which is closer to the front part of the automobile body than the extended wall 60 and provided close to the third horizontal surface 35a, as a second water cutting off member blocks water W3. Water W4 as part of water W3 drips from a rear gutter wall 66 and is drained in the hollow part 52A. The rear gutter wall 66 is provided on a position of connection between the extended wall 60 and the rear wall 61. The rear gutter wall 66 leans diagonally downward toward the inner side (illustration omitted). The front wall 63, which is provided close to the third horizontal surface 35a, as a third water cutting off member blocks water W5. Water W6 as part of water W5 advances along the front gutter wall 62, the lateral gutter wall 56, and the upper end 51a, and is drained in the hollow part 52A. The front wall 63 has the front lateral wall 57 connected to an edge closer to the front part of the automobile body as well as the rear lateral wall 64 connected to the first edge. This configuration prevents water W6 from permeating the truck cargo bed 1.

More specifically, water W1, which permeates through the space between the shutter 100 and the tailgate 5, is blocked by the extended wall 60 as the first water cutting off member first, and is decreased to water W3 by water W2. Next, water W3 is blocked by the rear wall 61 as the second water cutting off member and is decreased to water W5 by water W4. Next, water W5 is blocked by the front wall 63 as the third water cutting off member and is decreased to water W7 by water W6.

The three water cutting off members decrease water W1 three times by water W2, water W4, and water W6, and finally up to water W7. This configuration minimizes the amount of water W7, which permeates the truck cargo bed 1.

Water W2, blocked by the extended wall 60, is guided toward the part of the extended wall 60 closer to the rear part of the automobile body and is drained toward the exterior of the automobile.

Water W3 passes above the top edge 60a. Water W4, which is part of water W3 and blocked by the rear wall 61, is guided into the hollow part 52A and drained toward the exterior of the automobile from a drain hole (illustration omitted) provided on a lower part of the automobile body.

Water W5 passes above the top edge 61a. Water W6, which is part of water W5 and blocked by the front wall 63, is guided into the front gutter wall 62, provided between the rear wall 61 and the front wall 63, and is drained toward the exterior of the automobile from the drain hole through the lateral gutter wall 56 and the hollow part 52A.

As illustrated in FIGS. 9 and 17, each of the larger lip 70 and the smaller lip 80 has an upper surface which extends upward and leans toward the rear part of the automobile body. When the shutter 100 is in the closed position, the larger lip 70 directly makes elastic contact with the shutter 100 and the smaller lip 80 directly makes elastic contact with the end cap 30. The upper surface of the larger lip 70 guides the shutter 100 to prevent the shutter 100 from getting caught by the larger lip 70, and the upper surface of the smaller lip 80 guides the end cap 30 to prevent the end cap 30 from getting caught by the smaller lip 80. This configuration prevents the upper side part of the bed liner seal member 50 from bending abnormally.

The upper surface of the larger lip 70 and the upper surface of the smaller lip 80, which extend upward and lean toward the rear part of the automobile body, also prevent the shutter 100 and the end cap 30 from getting caught by larger lip 70 and the smaller lip 80, and prevent the upper side part of the bed liner seal member 50 from bending abnormally when the shutter approaches an opened position from the closed position.

In this embodiment, the die-molded part 50B has the lateral gutter wall 56, which extends toward the front part of the automobile body from the hollow wall 52, and has the upper part that extends toward the front part of the automobile body. The hollow wall 52 continuously extends upward from the extrusion-molded part 50A. In some embodiments, the lateral gutter wall 56 is omitted and water W6 is directly drained in the hollow part 52A from the front gutter wall 62.

We claim:

1. A sealing structure for a truck cargo bed with a shutter, the sealing structure comprising:
   the truck cargo bed;
   the shutter, the shutter coupling to an upper part of the truck cargo bed by a left track and a right track, the shutter extending in parallel with the truck cargo bed, and the shutter being movable between at least two positions in a front-rear direction of an automobile body to open and close an opening at the upper part of the truck cargo bed;
   an end cap fit on a left side surface and a right side surface of the shutter, the end cap being configured to couple the shutter to the left track and the right track, and the end cap including:
      a first horizontal surface configured to cover an upper part of a tailgate when the shutter is in a closed position with the tailgate in a closed position; and
      a second horizontal surface lower than the first horizontal surface;
   a left side wall vertically mounted on a left end of the truck cargo bed;
   a right side wall vertically mounted on a right end of the truck cargo bed;
   the left track, which is mounted on a top edge of the left side wall;
   the right track, which is mounted on a top edge of the right side wall;
   the tailgate, which is mounted on a rear end of the truck cargo bed, the tailgate being pivotal in the front-rear direction of the automobile body with a lower end part of the tailgate as a pivotal axis, and the tailgate and the left and right side walls surrounding the truck cargo bed when the tailgate is in the closed position;
   a shutter seal member provided on a rear end of the shutter, and the shutter seal member being configured to elastically contact with the tailgate when the tailgate is in the closed position; and
   a bed liner seal member provided on rear ends of the left and right side walls, and the bed liner seal member including:

an installation plate member which extends in an upper-lower direction of the automobile body, the installation plate member having an upper end;

a hollow wall unified with the installation plate member, the hollow wall extending in the upper-lower direction, the hollow wall having an upper end higher than the upper end of the installation plate member, the hollow wall having an opening at an upper part, the upper end of the hollow wall having part closer to an exterior of an automobile relative to a side surface of the automobile body, the hollow wall being configured to make elastic contact with the tailgate when the tailgate is in the closed position, and the hollow wall being configured to make elastic contact with the end cap when the shutter is in the closed position; and an extended wall which extends upward in a vertical direction from the part of the upper end of the hollow wall closer to the exterior of the automobile relative to the side surface of the automobile body, the extended wall having a top edge, the top edge of the extended wall facing and contactlessly approaching the second horizontal surface of the end cap when the shutter is in the closed position.

2. The sealing structure as claimed in claim 1, further comprising:

an extended installation member provided on an upper part of the installation plate member of the bed liner seal member, the extended installation member extending toward the exterior of the automobile relative to the side surface of the automobile body;

an installation member connected to an end of the extended installation member, the installation member being configured to attach the bed liner seal member to the rear ends of the left and right side walls;

a rear wall which extends upward in the vertical direction from an upper end of the extended installation member, the rear wall having a wall surface in the front-rear direction of the automobile body, the rear wall having a top edge, the rear wall having a first edge closer to the exterior of the automobile;

a front gutter wall which extends toward a front part of the automobile body from the middle of rear wall, the front gutter wall gradually lowering toward an interior of the automobile relative to the side surface of the automobile body, the front gutter wall having a first edge closer to the exterior of the automobile and a second edge closer to the interior of the automobile;

a front wall which extends upward in the vertical direction from an end of the front gutter wall closer to the front part of the automobile body, the front wall being parallel to the rear wall, the front wall having a top edge, the front wall having a first edge closer to the exterior of the automobile and a second edge closer to the interior of the automobile;

a rear lateral wall which extends upward in the vertical direction, the rear lateral wall being higher than the rear wall and the front wall, and the rear lateral wall being configured to connect the first edge of the rear wall, the first edge of the front gutter wall, and the first edge of the front wall; and a third horizontal surface provided on the end cap, the third horizontal surface being lower than the second horizontal surface, and the rear wall and the front wall are lower than the extended wall, and when the shutter is in the closed position, the top edge of the rear wall and the top edge of the front wall face and contactlessly approach the third horizontal surface.

3. The sealing structure as claimed in claim 2, further comprising:

a lateral gutter wall which extends toward the front part of the automobile body from the upper end of the installation plate member of the bed liner seal member;

a front lateral wall provided closer to the exterior of the automobile relative to the side surface of the automobile body than the lateral gutter wall, the front lateral wall extending vertically, the front lateral wall having a wall surface in an inner-cabin and outer-cabin direction, the front lateral wall having an edge closer to a rear part of the automobile body continuous with the second edge of the front wall, and the front lateral wall being as high as the front wall;

an inner peripheral wall vertically provided between part of the lateral gutter wall closer to the front part of the automobile body and part of the lateral gutter wall closer to the interior of the automobile relative to the side surface of the automobile body, the inner peripheral wall having part closer to the front part of the automobile body continuous with the front lateral wall and part closer to the rear part of the automobile body continuous with the hollow wall; and a hollow part surrounded by the hollow wall, and the second edge of the front gutter wall is connected with an edge of the lateral gutter wall closer to the exterior of the automobile, to drain water guided into the front gutter wall toward the exterior of the automobile through the lateral gutter wall and the hollow part.

4. The sealing structure as claimed in claim 3, further comprising a larger lip provided on a top edge of the hollow wall of the bed liner seal member, the larger lip continuously extending alongside of part of the hollow wall closer to the rear part of the automobile body, part of the hollow wall closer to the interior of the automobile relative to the side surface of the automobile body, and the inner peripheral wall, the inner peripheral wall extending vertically from the lateral gutter wall, and the larger lip extending toward an inner side of the hollow wall, and when the shutter is in the closed position, part of the larger lip closer to the front part of the automobile body makes elastic contact with a lower surface of a rear end of the shutter, and parts of the larger lip closer to the interior of the automobile relative to the side surface of the automobile body and closer to the rear part of the automobile body make elastic contact with the shutter seal member.

5. The sealing structure as claimed in claim 2, further comprising a smaller lip provided on an upper part of the extended installation member of the bed liner seal member, the smaller lip protruding toward the rear part of the automobile body, the smaller lip having the extended wall connected therewith, and the smaller lip having an upper surface, and when the shutter is in the closed position, the upper surface of the smaller lip makes elastic contact with the second horizontal surface of the end cap.

6. The sealing structure as claimed in claim 5, wherein the smaller lip extends upward and leans toward the rear part of the automobile body.

7. The sealing structure as claimed in claim 1, wherein:

the upper part of the hollow wall of the bed liner seal member is formed by die molding; and the extended wall widens gradually toward an upper part.

8. The sealing structure as claimed in claim 3, further comprising a smaller lip provided on an upper part of the extended installation member of the bed liner seal member, the smaller lip protruding toward the rear part of the automobile body, the smaller lip having the extended wall connected therewith, and the smaller lip having an upper surface, and
- when the shutter is in the closed position, the upper surface of the smaller lip makes elastic contact with the second horizontal surface of the end cap.

9. The sealing structure as claimed in claim 4, further comprising a smaller lip provided on an upper part of the extended installation member of the bed liner seal member, the smaller lip protruding toward the rear part of the automobile body, the smaller lip having the extended wall connected therewith, and the smaller lip having an upper surface, and
- when the shutter is in the closed position, the upper surface of the smaller lip makes elastic contact with the second horizontal surface of the end cap.

10. The sealing structure as claimed in claim 8, wherein the smaller lip extends upward and leans toward the rear part of the automobile body.

11. The sealing structure as claimed in claim 9, wherein the smaller lip extends upward and leans toward the rear part of the automobile body.

12. The sealing structure as claimed in claim 2, wherein:
- the upper part of the hollow wall of the bed liner seal member is formed by die molding; and
- the extended wall widens gradually toward an upper part.

13. The sealing structure as claimed in claim 3, wherein:
- the upper part of the hollow wall of the bed liner seal member is formed by die molding; and
- the extended wall widens gradually toward an upper part.

14. The sealing structure as claimed in claim 4, wherein:
- the upper part of the hollow wall of the bed liner seal member is formed by die molding; and
- the extended wall widens gradually toward an upper part.

15. The sealing structure as claimed in claim 5, wherein:
- the upper part of the hollow wall of the bed liner seal member is formed by die molding; and
- the extended wall widens gradually toward an upper part.

16. The sealing structure as claimed in claim 6, wherein:
- the upper part of the hollow wall of the bed liner seal member is formed by die molding; and
- the extended wall widens gradually toward an upper part.

17. The sealing structure as claimed in claim 8, wherein:
- the upper part of the hollow wall of the bed liner seal member is formed by die molding; and
- the extended wall widens gradually toward an upper part.

18. The sealing structure as claimed in claim 9, wherein:
- the upper part of the hollow wall of the bed liner seal member is formed by die molding; and
- the extended wall widens gradually toward an upper part.

19. The sealing structure as claimed in claim 10, wherein:
- the upper part of the hollow wall of the bed liner seal member is formed by die molding; and
- the extended wall widens gradually toward an upper part.

20. The sealing structure as claimed in claim 11, wherein:
- the upper part of the hollow wall of the bed liner seal member is formed by die molding; and
- the extended wall widens gradually toward an upper part.

* * * * *